US012601897B2

(12) United States Patent
Chen et al.

(10) Patent No.: US 12,601,897 B2
(45) Date of Patent: Apr. 14, 2026

(54) OPTICAL LENS ASSEMBLY

(71) Applicant: Zhejiang Sunny Optics Co., Ltd, Yuyao City (CN)

(72) Inventors: Weiwang Chen, Yuyao City (CN); Fan Yang, Yuyao City (CN); Fujian Dai, Yuyao City (CN); Liefeng Zhao, Yuyao City (CN)

(73) Assignee: Zhejiang Sunny Optics Co., Ltd., Yuyao City (CN)

( * ) Notice: Subject to any disclaimer, the term of this patent is extended or adjusted under 35 U.S.C. 154(b) by 225 days.

(21) Appl. No.: 18/302,770

(22) Filed: Apr. 18, 2023

(65) Prior Publication Data

US 2024/0159991 A1 May 16, 2024

(30) Foreign Application Priority Data

Nov. 11, 2022 (CN) .......................... 202211413579.5

(51) Int. Cl.
*G02B 13/00* (2006.01)
*G02B 7/02* (2021.01)
*G02B 9/60* (2006.01)

(52) U.S. Cl.
CPC ......... *G02B 13/0045* (2013.01); *G02B 7/021* (2013.01); *G02B 9/60* (2013.01)

(58) Field of Classification Search
CPC ...... G02B 13/0045; G02B 7/021; G02B 9/60; G02B 13/0015; G02B 13/18; G02B 13/00; G03B 30/00
See application file for complete search history.

(56) References Cited

U.S. PATENT DOCUMENTS

2022/0342184 A1 10/2022 Liao et al.

FOREIGN PATENT DOCUMENTS

| CN | 113109927 | A | 7/2021 | |
|---|---|---|---|---|
| CN | 114114629 | A | 3/2022 | |
| CN | 218647227 | U | 3/2023 | |
| CN | 118348653 | * | 7/2024 | ............. G03B 30/00 |

OTHER PUBLICATIONS

Chinese Office Action corresponding to application 202211413579. 5, dated Aug. 11, 2025, 10 pages.

* cited by examiner

*Primary Examiner* — Brandi N Thomas
(74) *Attorney, Agent, or Firm* — Reising Ethington P.C.

(57) ABSTRACT

An optical lens assembly, including: a lens barrel; five lenses arranged sequentially along optical axis; a first spacer, in contact with at least part of an image-side surface of a first lens; a second spacer, in contact with at least part of an image-side surface of the second lens; and a focal length f2 of the second lens, the center thickness CT2 of the second lens on the optical axis, an air spacing T23 between the second lens and a third lens on the optical axis, a maximum thickness CP2 of the second spacer, and a distance EP12 between an image-side surface of the first spacer and an object-side surface of the second spacer along the optical axis satisfy: $-50.0 < f2/(CT2+T23) + f2/(EP12+CP2) < 0$.

20 Claims, 9 Drawing Sheets

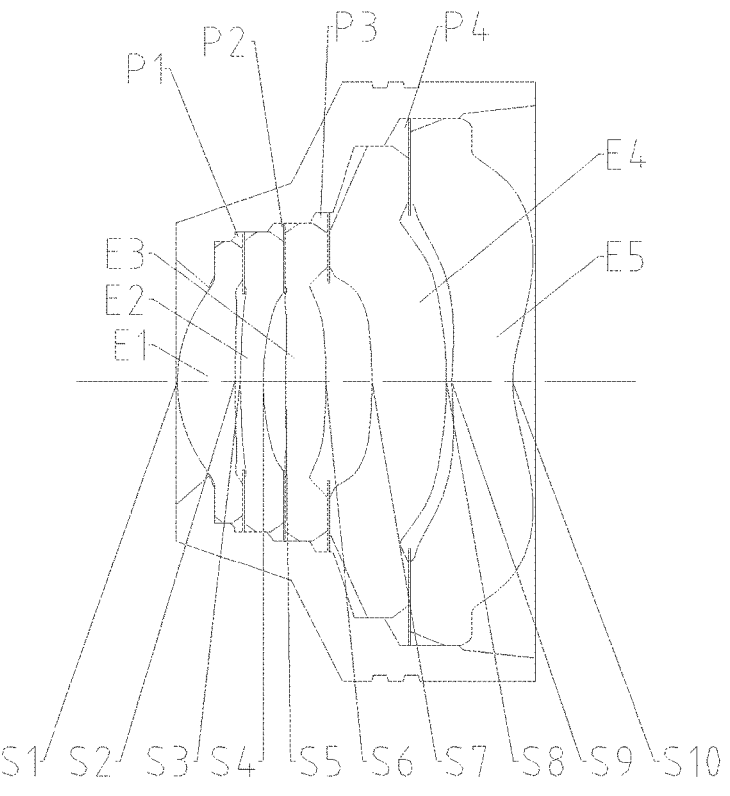
Fig. 4
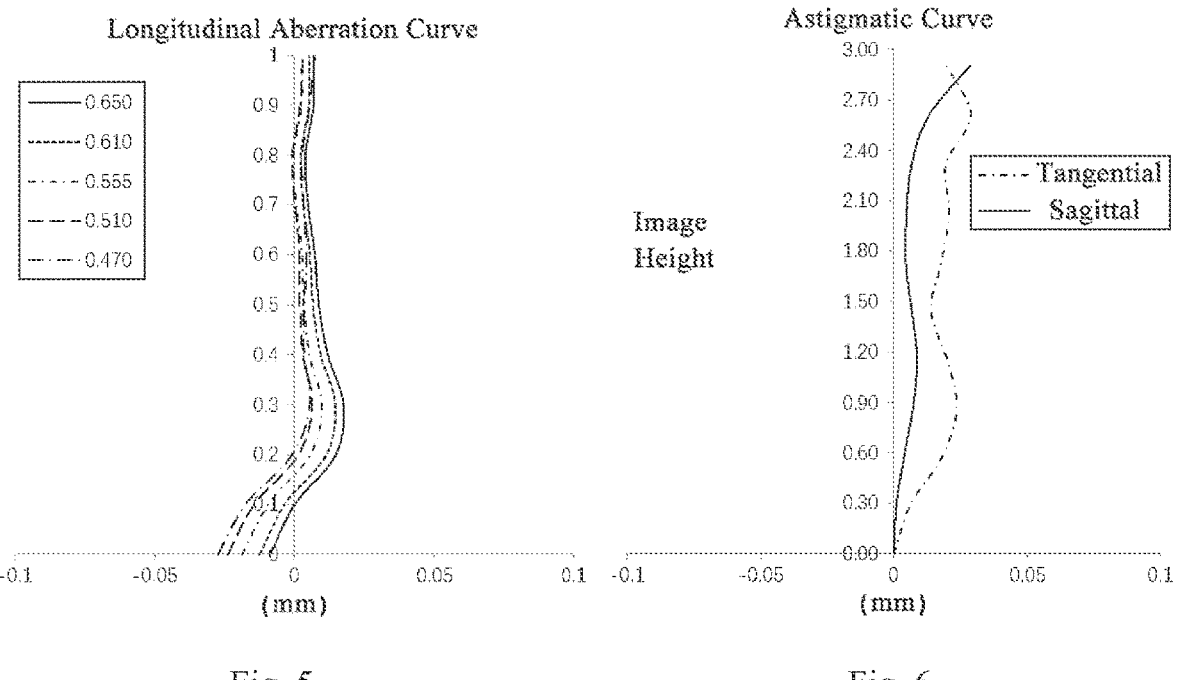
Fig. 5                                                    Fig. 6

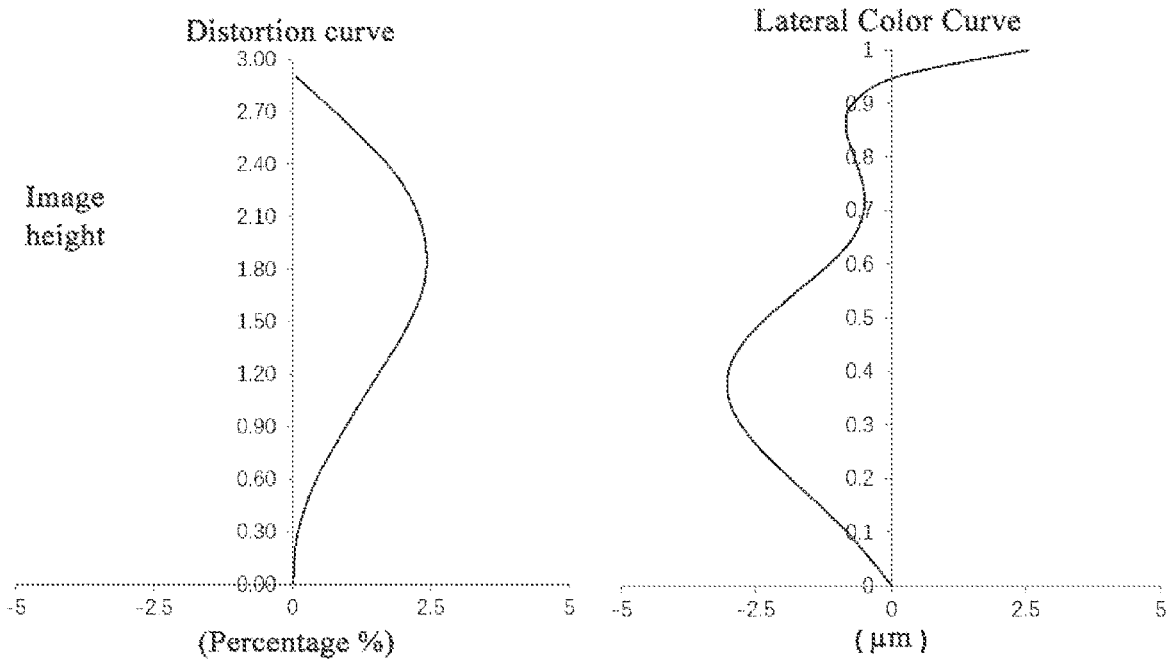
Fig. 7                                                    Fig. 8
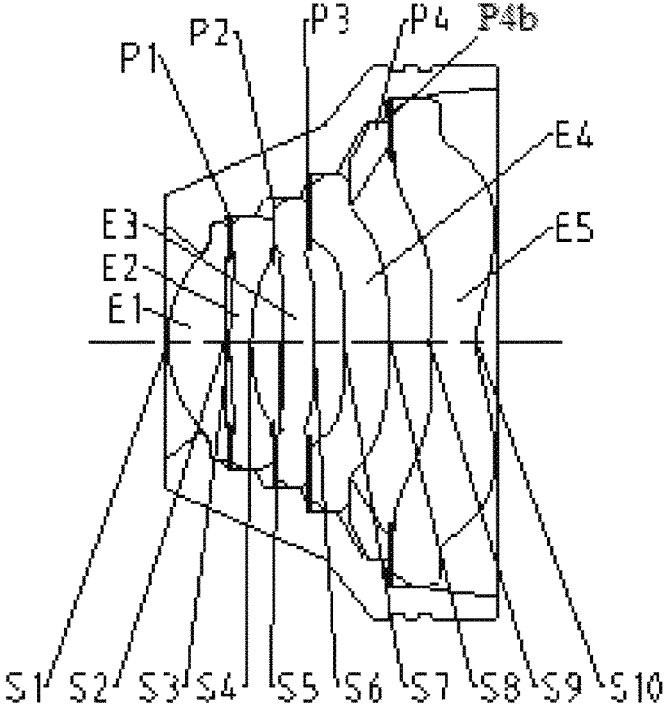
Fig. 9

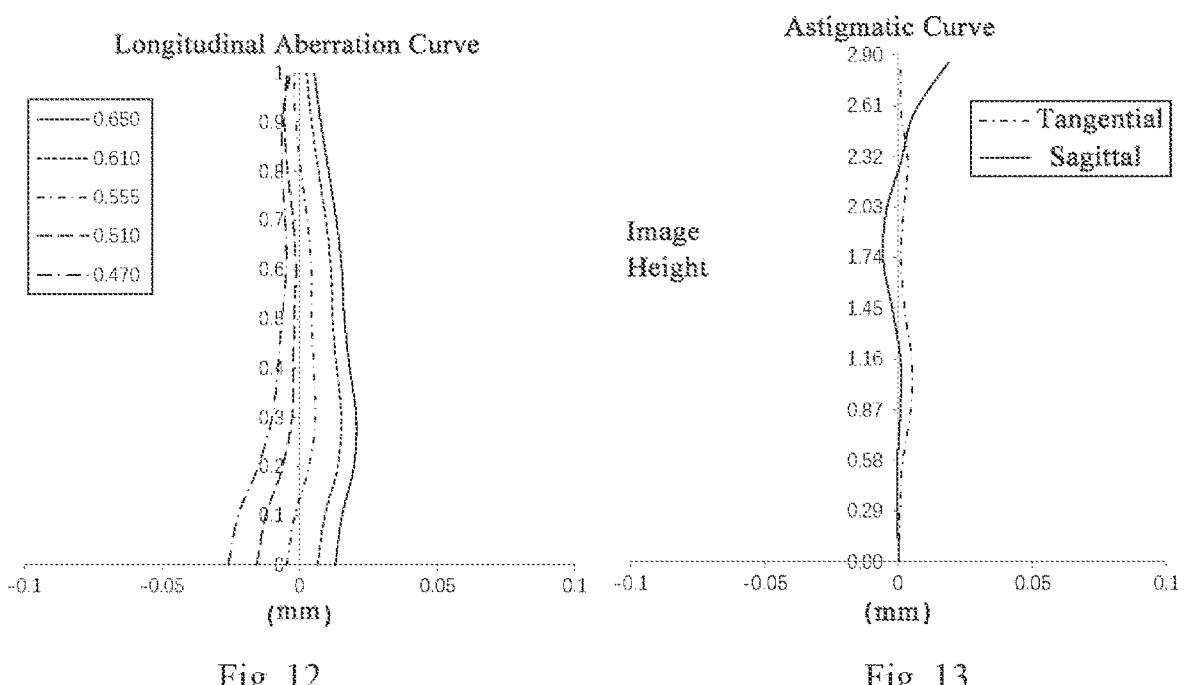
Fig. 12
Fig. 13
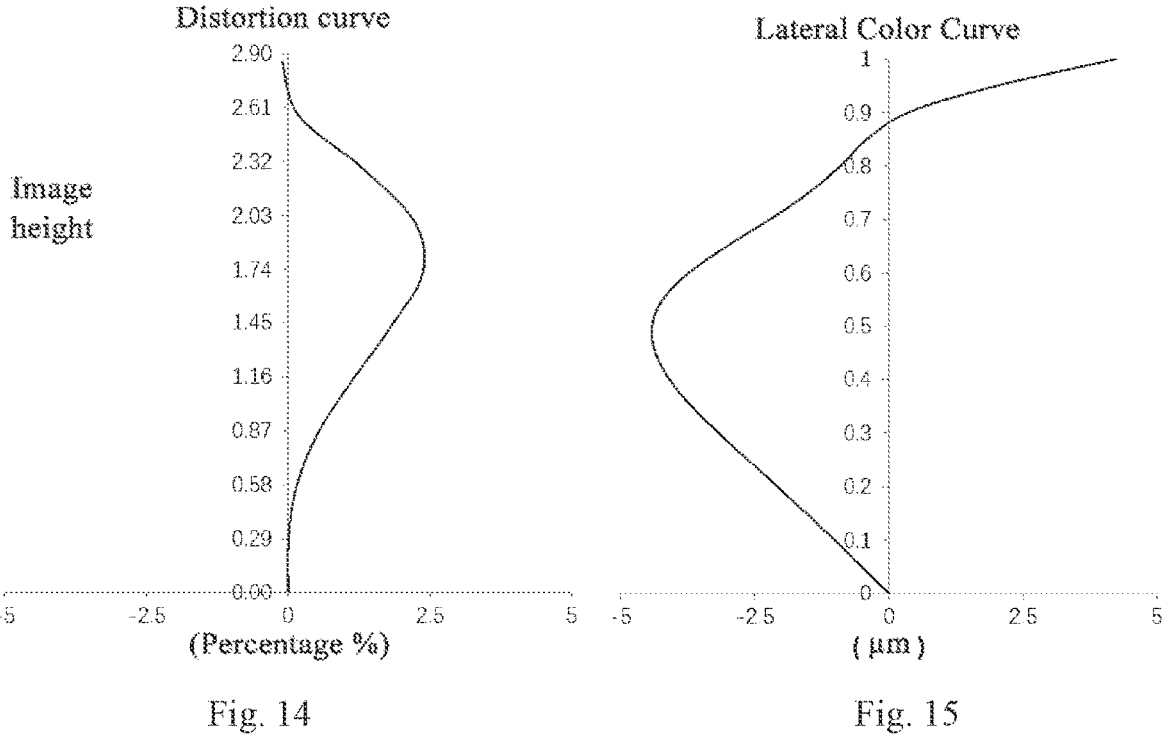
Fig. 14
Fig. 15

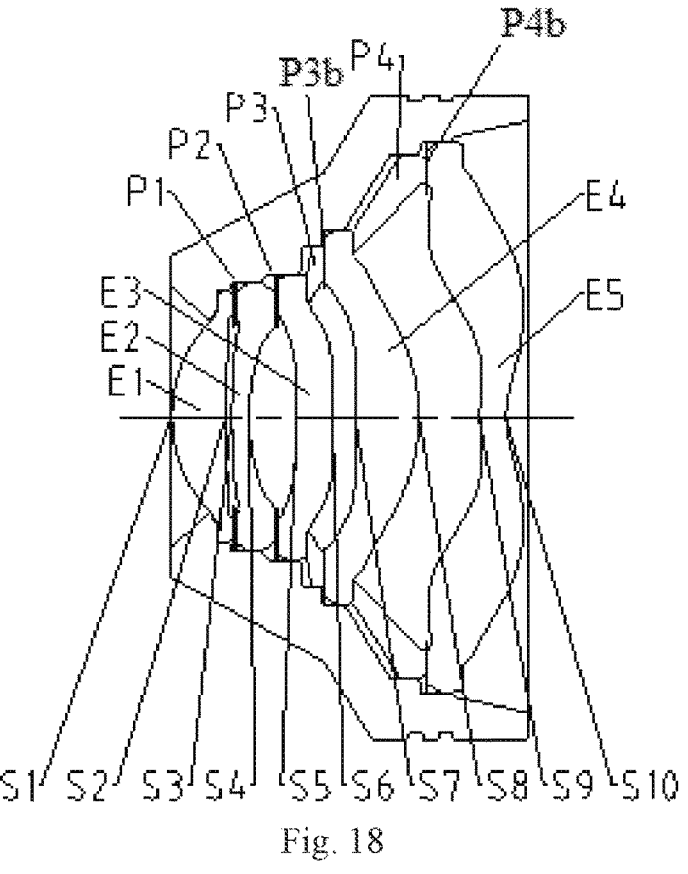
Fig. 18
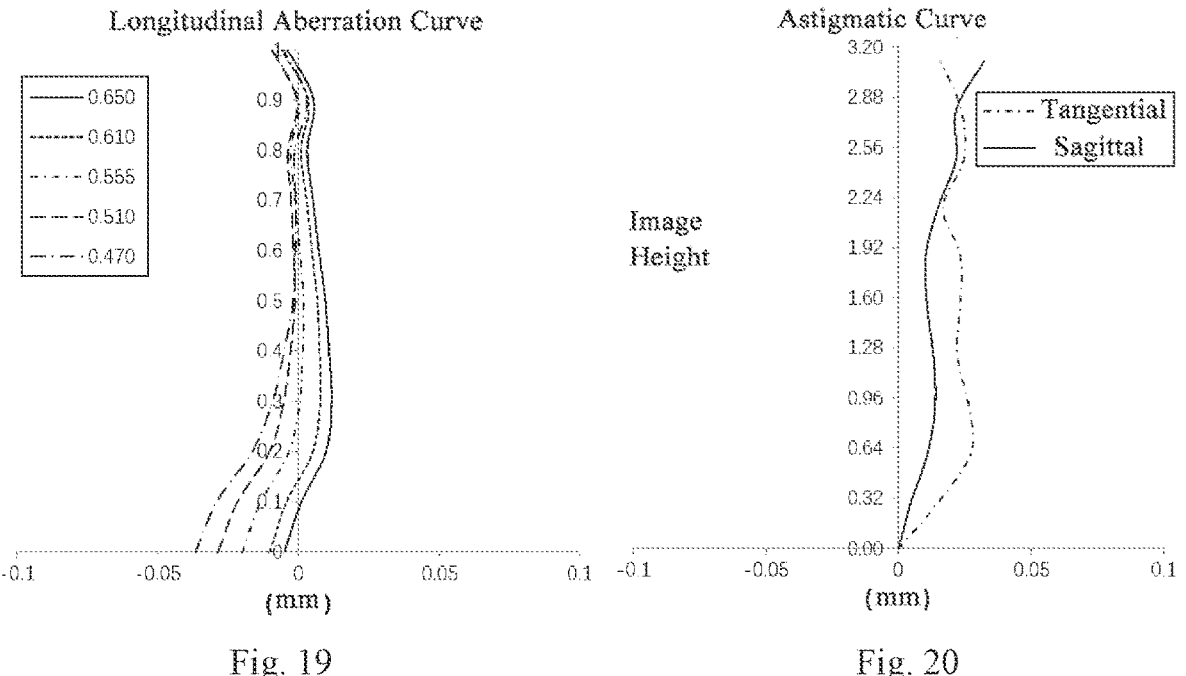
Fig. 19                                    Fig. 20

OPTICAL LENS ASSEMBLY

CROSS-REFERENCE TO RELATED APPLICATIONS

This application claims benefit of priority to Chinese Patent Application No. 202211413579.5 filed on Nov. 11, 2022 before the China National Intellectual Property Administration, the entire disclosure of which is incorporated herein by reference in its entity.

TECHNICAL FIELD

The present disclosure relates to the technical field of optical imaging devices, in particular, to an optical lens assembly.

BACKGROUND

As mobile phones play an increasingly important role in lives, consumers are more willing to pay for thin, light and beautiful mobile phones, which has led to module manufacturers' increasingly high requirements for the appearance and a thin and light size of mobile phones, and an increasing number of lens assemblies with various performance are mounted on a single mobile phone. Under the premise of ensuring stable performance and manufacturing feasibility of the lens assemblies, a smaller space proportion of a single lens assembly and miniaturization of modules have gradually become common goals pursued by lens assembly suppliers and module manufacturers. Therefore, under the premise of ensuring optical performance, an ultra-thin and compact optical system obtained by reasonable structural design for key positions relatively close to a front end of the lens assembly is an important task.

In other words, the optical lens assemblies in conventional technology are difficult to take into account both miniaturization and high imaging quality.

SUMMARY

The main objective of the present disclosure is to provide an optical lens assembly to solve the problem that optical lens assemblies in conventional technology are difficult to take into account both miniaturization and high imaging quality.

To achieve the above objective, according to one aspect of the present disclosure, an optical lens assembly is provided, including: a lens barrel; five lenses, the five lenses comprising a first lens, a second lens, a third lens, a fourth lens, and a fifth lens sequentially from an object side to an image side; a first spacer, in contact with at least part of an image-side surface of a first lens; a second spacer, in contact with at least part of an image-side surface of the second lens; and a focal length $f2$ of the second lens, the center thickness $CT2$ of the second lens on the optical axis, an air spacing $T23$ between the second lens and a third lens on the optical axis, a maximum thickness $CP2$ of the second spacer, and a distance $EP12$ between an image-side surface of the first spacer and an object-side surface of the second spacer along the optical axis satisfy: $-50.0<f2/(CT2+T23)+f2/(EP12+CP2)<0$.

Furthermore, a center thickness of the second lens on an optical axis of the optical lens assembly is less than center thicknesses of other four lenses on the optical axis, and the center thickness $CT2$ of the second lens on the optical axis is less than 0.4 mm.

Furthermore, a height $L$ of the lens barrel, a focal length $f$ of the optical lens assembly, and a maximal field-of-view $FOV$ of the optical lens assembly satisfy: $1.2<L/[f \times \tan(FOV/2)]<1.6$.

Furthermore, at least one lens in the first to the fourth lenses has a positive refractive power, and a lens having a positive refractive power in the first to the fourth lens satisfies: $0.1<fi/dis<10.0$; wherein $fi$ is an effective focal length of an ith lens, dis is an inner diameter of an object-side surface of an ith spacer in contact with an image-side surface of the ith lens, and i takes a value from 1, 2, 3, or 4.

Furthermore, an absolute value of a focal length of at least one lens in the first to the fourth lenses is less than 5, a lens having the absolute value of the focal length less than 5 and with an image-side surface in contact with a spacer satisfies: $0<Djs/R2j-1<5.0$, wherein $R2j-1$ is a radius of curvature of an object-side surface of a jth lens, $Djs$ is an outer diameter of an object-side surface of a jth spacer in contact with an image-side surface of the jth lens, and j takes a value from 1, 2, 3, or 4.

Furthermore, the optical lens assembly satisfies: $10.0<f1/(CP1+EP12)-f2/(CP2+EP12)<50.0$, wherein $f1$ is an effective focal length of the first lens, $f2$ is the effective focal length of the second lens, $CP1$ is a thickness of the first spacer, $CP2$ is a thickness of the second spacer, $EP12$ is the distance between the image-side surface of the first spacer and the object-side surface of the second spacer on the optical axis.

Furthermore, the first to the fourth lenses satisfy: $-10.0<(R2n+R2n+1)/dns<70.0$, $R2n$ is a radius of curvature of an image-side surface of a nth lens, $R2n+1$ is a radius of curvature of an object-side surface of a (n+1)th lens, dns is an inner diameter of an object-side surface of an nth spacer in contact with the image-side surface of the nth lens, and n takes a value from 1, 2, 3, or 4.

Furthermore, the optical lens assembly further comprises a fourth spacer in contact with an image-side surface of the fourth lens, a radius of curvature $R2$ of an image-side surface of the first lens, a radius of curvature $R9$ of an object-side surface of the fifth lens, an inner diameter $d1s$ of an object-side surface of the first spacer, and an inner diameter $d4s$ of an object-side surface of the fourth spacer, satisfy: $1.0<R2/d1s+R9/d4s<10.0$.

Furthermore, the optical lens assembly further comprises a fourth spacer in contact with an image-side surface of the fourth lens, and a third spacer in contact with an image-side surface of the third lens, wherein a combined focal length $f23$ of the first lens and the second lens, a combined focal length $f45$ of the fourth lens and the fifth lens, a distance $EP23$ between an image-side surface of the second spacer and an object-side surface of the third spacer along the optical axis, and a distance $EP34$ between an image-side surface of the third spacer and an object-side surface of the fourth spacer along the optical axis, satisfy: $-100.0<f23/EP23+f45/EP34<110.0$.

Furthermore, the optical lens assembly further comprises a fourth spacer in contact with an image-side surface of the fourth lens, the center thickness $CT2$ of the second lens on the optical axis, a center thickness $CT3$ of the third lens on the optical axis, a center thickness $CT5$ of the fifth lens on the optical axis, an outer diameter $D2s$ of the object-side surface of the second spacer, and an outer diameter $D4s$ of an object-side surface of the fourth spacer, satisfy: $5.0<D2s/(CT2+CT3)+D4s/(CT4+CT5)<15.0$.

Furthermore, an entrance pupil diameter $EPD$ of the optical lens assembly, an inner diameter $d1s$ of an object-side surface of the first spacer, the effective focal length $f$ of the optical lens assembly, and an effective focal length f1 of the first lens, satisfy: $5.0<(EPD+d1s)/(f-f1)<20.0$.

Furthermore, a refractive power of the first lens and a refractive power of the second lens are positive-negative opposite, and an absolute value of an effective focal length of the first lens is less than an absolute value of an effective focal length of the third lens.

Furthermore, an effective focal length f1 of the first lens, the effective focal length f2 of the second lens, and an effective focal length f3 of the third lens satisfy: $|f1/f3|<1.0$, $f1/f2<-0.01$.

Furthermore, a radius of curvature R3 of an object-side surface of the second lens, a radius of curvature R4 of the image-side surface of the second lens, and a radius of curvature R6 of an image-side surface of the third lens satisfy: $R3>R4$, $|R4|<|R6|$.

Furthermore, an absolute value of a radius of curvature of each of the first to fourth lenses is greater than an absolute value of a radius of curvature of an image-side surface of a fifth lens.

Furthermore, a radius of curvature R1 of an object-side surface of the first lens, a radius of curvature R2 of an image-side surface of the first lens, a radius of curvature R9 of an object-side surface of a fifth lens, and a radius of curvature R10 of an image-side surface of the fifth lens satisfy: $R1/R9>0.1$, $R2/R10>1.0$.

According to another aspect of the present disclosure, an optical lens assembly is provided, including: a lens barrel; five lenses, the five lenses comprising a first lens, a second lens, a third lens, a fourth lens, and a fifth lens sequentially from an object side to an image side; a first spacer, in contact with at least part of an image-side surface of the first lens; a second spacer, in contact with at least part of an image-side surface of the second lens; and an effective focal length f1 of the first lens, an effective focal length f2 of the second lens, a thickness CP1 of the first spacer, a thickness CP2 of the second spacer, and a distance EP12 between an image-side surface of the first spacer and an object-side surface of the second spacer on the optical axis satisfy: $10.0<f1/(CP1+EP12)-f2/(CP2+EP12)<50.0$.

Furthermore, a height L of the lens barrel, a focal length f of the optical lens assembly, and a maximal field-of-view FOV of the optical lens assembly satisfy: $1.2<L/[f\times\tan(FOV/2)]<1.6$.

Furthermore, a center thickness of the second lens on an optical axis of the optical lens assembly is less than center thicknesses of other four lenses on the optical axis, and the center thickness CT2 of the second lens on the optical axis is less than 0.4 mm.

Furthermore, at least one lens in the first to the fourth lenses has a positive refractive power, and a lens having a positive refractive power in the first to the fourth lenses satisfies: $0.1\leq fi/dis<10.0$; wherein fi is an effective focal length of an ith lens, dis is an inner diameter of an object-side surface of an ith spacer in contact with an image-side surface of the ith lens, and i takes a value from 1, 2, 3, or 4.

Furthermore, an absolute value of a focal length of at least one lens in the first to the fourth lenses is less than 5, a lens having the absolute value of the focal length less than 5 and with an image-side surface in contact with a spacer satisfies: $0<Djs/R2j-1<5.0$, wherein R2j−1 is a radius of curvature of an object-side surface of a jth lens, Djs is an outer diameter of an object-side surface of a jth spacer in contact with an image-side surface of the jth lens, and j takes a value from 1, 2, 3, or 4.

Furthermore, the first to the fourth lenses satisfy: $-10.0<(R2n+R2n+1)/dns<70.0$, R2n is a radius of curvature of an image-side surface of a nth lens, R2n+1 is a radius of curvature of an object-side surface of a (n+1)th lens, dns is an inner diameter of an object-side surface of an nth spacer in contact with the image-side surface of the nth lens, and n takes a value from 1, 2, 3, or 4.

Furthermore, the optical lens assembly further comprises a fourth spacer in contact with an image-side surface of the fourth lens, a radius of curvature R2 of an image-side surface of the first lens, a radius of curvature R9 of an object-side surface of the fifth lens, an inner diameter d1s of an object-side surface of the first spacer, and an inner diameter d4s of an object-side surface of the fourth spacer, satisfy: $1.0<R2/d1s+R9/d4s<10.0$.

Furthermore, the optical lens assembly further comprises a fourth spacer in contact with an image-side surface of the fourth lens, and a third spacer in contact with an image-side surface of the third lens, wherein a combined focal length f23 of the first lens and the second lens, a combined focal length f45 of the fourth lens and the fifth lens, a distance EP23 between an image-side surface of the second spacer and an object-side surface of the third spacer along the optical axis, and a distance EP34 between an image-side surface of the third spacer and an object-side surface of the fourth spacer along the optical axis, satisfy: $-100.0<f23/EP23+f45/EP34<110.0$.

Furthermore, the optical lens assembly further comprises a fourth spacer in contact with an image-side surface of the fourth lens, the center thickness CT2 of the second lens on the optical axis, a center thickness CT3 of the third lens on the optical axis, a center thickness CT5 of the fifth lens on the optical axis, an outer diameter D2s of the object-side surface of the second spacer, and an outer diameter D4s of an object-side surface of the fourth spacer, satisfy: $5.0<D2s/(CT2+CT3)+D4s/(CT4+CT5)<15.0$.

Furthermore, an entrance pupil diameter EPD of the optical lens assembly, an inner diameter d1s of an object-side surface of the first spacer, the effective focal length f of the optical lens assembly, and an effective focal length f1 of the first lens, satisfy: $5.0<(EPD+d1s)/(f-f1)<20.0$.

Furthermore, a refractive power of the first lens and a refractive power of the second lens is positive-negative opposite, and an absolute value of an effective focal length of the first lens is less than an absolute value of an effective focal length of the third lens.

Furthermore, an effective focal length f1 of the first lens, the effective focal length f2 of the second lens, and an effective focal length f3 of the third lens satisfy: $|f1/f3|<1.0$, $f1/f2<-0.01$.

Furthermore, a radius of curvature R3 of an object-side surface of the second lens, a radius of curvature R4 of the image-side surface of the second lens, and a radius of curvature R6 of an image-side surface of the third lens satisfy: $R3>R4$, $|R4|<|R6|$.

Furthermore, an absolute value of a radius of curvature of each of the first to fourth lenses is greater than an absolute value of a radius of curvature of an image-side surface of a fifth lens.

Furthermore, a radius of curvature R1 of an object-side surface of the first lens, a radius of curvature R2 of an image-side surface of the first lens, a radius of curvature R9 of an object-side surface of a fifth lens, and a radius of curvature R10 of an image-side surface of the fifth lens satisfy: $R1/R9>0.1$, $R2/R10>1.0$.

Applying the technical solution of the present disclosure, the optical lens assembly includes a lens barrel, five lenses, a first spacer and a second spacer, the five lenses comprising a first lens, a second lens, a third lens, a fourth lens, and a fifth lens sequentially from an object side to an image side; the first spacer is in contact with at least part of an image-side surface of a first lens; the second spacer is in contact with at least part of an image-side surface of the second lens; and a focal length f2 of the second lens, the center thickness CT2 of the second lens on the optical axis, an air spacing T23 between the second lens and a third lens on the optical axis, a maximum thickness CP2 of the second spacer, and a distance EP12 between an image-side surface of the first spacer and an object-side surface of the second spacer along the optical axis satisfy: $-50.0 < f2/(CT2+T23)+f2/(EP12+CP2)<0$.

By reasonably controlling the relationship between the focal length of the second lens, the thickness of the second lens, the air spacing between the second and third lenses, and the related parameters of the second spacer, it is helpful to reasonably control the effective focal length of the optical imaging system and adjust the center thicknesses of the other lenses, reasonably control the performance of coma aberrations of the system, reduce a position proportion of the positions of the second lens and the third lens in the imaging system, control a front part size of the imaging system, help to improve compactness of the imaging system structure, and ensure that the optical system has good optical performance, at the same time further meet the requirement for ultra-thin performance, so that the five-piece optical lens assembly in the present disclosure has the advantages of high imaging quality and miniaturization.

BRIEF DESCRIPTION OF THE DRAWINGS

The accompanying drawings of the specification forming part of the present disclosure are used to provide a further understanding of the disclosure, and schematic embodiments of the present disclosure and their descriptions are used to explain the present disclosure, and do not constitute an undue limitation of the present disclosure. In the accompanying drawings:

FIG. 2 to FIG. 4 respectively illustrate schematic structural diagrams of an optical lens assembly in Example I of the present disclosure in a first state, a second state and a third state;

FIG. 5 to FIG. 8 respectively illustrate a longitudinal aberration curve, an astigmatic curve, a distortion curve and a lateral color curve in Example I of the present disclosure;

FIG. 9 to FIG. 11 respectively illustrate schematic structural diagrams of an optical lens assembly in Example II of the present disclosure in a first state, a second state and a third state;

FIG. 12 to FIG. 15 respectively illustrate a longitudinal aberration curve, an astigmatic curve, a distortion curve and a lateral color curve in Example II of the present disclosure;

FIG. 16 to FIG. 18 respectively illustrate schematic structural diagrams of an optical lens assembly in Example III of the present disclosure in a first state, a second state and a third state; and FIG. 19 to FIG. 22 respectively illustrate a longitudinal aberration curve, an astigmatic curve, a distortion curve and a lateral color curve in Example III of the present disclosure.

Figure 1:
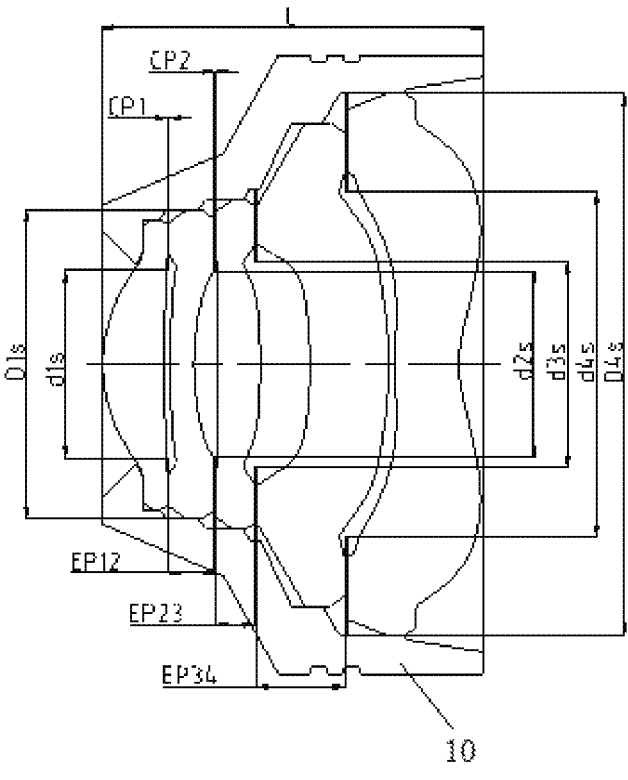
FIG. 1 shows a schematic structural diagram of an optical lens assembly according to an alternative embodiment of the present disclosure.

The above accompanying drawings include the following reference numerals: 10, Lens barrel; E1, first lens; S1, object-side surface of the first lens; S2, image-side surface of the first lens; P1, first spacer; E2, second lens; S3, object-side surface of the second lens; S4, image-side surface of the second lens; P2, second spacer; E3, third lens; S5, object-side surface of the third lens; S6, image-side surface of the third lens; P3, third spacer; P3b, third auxiliary spacer; E4, fourth lens; S7, object-side surface of the fourth lens; S8, image-side surface of the fourth lens; P4, fourth spacer; P4b, fourth auxiliary spacer; E5, fifth lens; S9, object-side surface of the fifth lens; S10, image-side surface of the fifth lens.

DETAILED DESCRIPTION OF EMBODIMENTS

It should be noted that embodiments in the present disclosure and the features in the embodiments may be combined with each other on a non-conflict basis. Embodiments of the present disclosure will be described in detail below with reference to the accompanying drawings.

It should be noted that, unless otherwise defined, all terms (including technical and scientific terms) used herein have the same meaning as commonly understood by those of ordinary skill in the art to which the present disclosure belongs.

In the present disclosure, in the absence of a contrary description, the use of locative words such as "up, below, top, bottom" is usually for the direction shown in the accompanying drawings, or for the component itself in the vertical, perpendicular or gravitational direction; similarly, for ease of understanding and description, "inner, outer" refers to the inner and outer contours relative to each component itself. The above locative words are not used to limit the present disclosure.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least in the paraxial area. If the lens surface is a concave surface and the position of the concave surface is not defined, it represents that the lens surface is a concave surface at least in the paraxial area. The surface type in the paraxial area may be determined as convex or concave by a positive and negative value of R (R refers to the radius of curvature in the paraxial area, usually refers to the R value on a lens data in optical software) according to the determination manner adopted by the one having common knowledge in the field. For an object-side surface, when the R value thereof is positive, it is determined as being a convex surface, when the R value thereof is negative, it is determined as being a concave surface; for an image-side surface, when the R value thereof is positive, it is determined as being a concave surface, when the R value thereof is negative, it is determined as being a convex surface.

In order to solve the problem that optical lens assemblies in the conventional technology are difficult to take into account both miniaturization and high imaging quality, the present disclosure provides an optical lens assembly.

Embodiment 1

As shown in FIG. 1 to FIG. 22, the optical lens assembly includes a lens barrel, five lenses (i.e., a first lens, a second lens, a third lens, a fourth lens, and a fifth lens, sequentially arranged along the optical axis of the optical lens assembly from the object side to the image side), a first spacer, and a second spacer, a center thickness of the second lens on the optical axis is less than center thicknesses of other four lenses on the optical axis, and the center thickness CT2 of the second lens on the optical axis is less than 0.4 mm; the first spacer is in contact with at least part of an image-side surface of the first lens; the second spacer is in contact with at least part of an image-side surface of the second lens; a height L of the lens barrel, a focal length f of the optical lens assembly, and a maximal field-of-view FOV of the optical lens assembly satisfy: $1.2 < L/[f \times \tan(FOV/2)] < 1.6$; and a focal length f2 of the second lens, the center thickness CT2 of the second lens on the optical axis, an air spacing T23 on the optical axis between the second lens and a third lens, a maximum thickness CP2 of the second spacer, and a distance EP12 between an image-side surface of the first spacer and an object-side surface of the second spacer along the optical axis satisfy: $-50.0 < f2/(CT2+T23)+f2/(EP12+CP2) < 0$.

By reasonably designing the overall height of the lens barrel, the focal length, the lens center thickness, the position of the first lens to the third lens, the spacing distance between lenses, the spacing distance between spacers, while improving a matching degree between the optical lens assembly and a chip, and meeting the requirement for ultra-thin characteristic, it may effectively reduce incident light with poor quality on an edge of a second surface of the first lens and useless light generated by reflection in the first lens mechanism, help to reasonably control the effective focal length of the optical imaging system and adjust the center thicknesses of the other lenses, reasonably control the performance of coma aberrations of the system, reduce a position proportion of the positions of the second lens and the third lens in the imaging system, control a front part size of the imaging system, help to improve compactness of the imaging system structure, and ensure that the optical system has good optical performance, at the same time further meet the requirement for ultra-thin performance, so that the five-piece optical lens assembly in the present disclosure has the advantages of high imaging quality and miniaturization.

In particular, by limiting $L/[f \times \tan(FOV/2)]$ to a reasonable range, the height L of the lens barrel, the focal length f of the optical lens assembly and the field-of-view may be mutual restrained, which may effectively reduce an incidence angle of the chief ray on the object side of the optical lens assembly, can improve a matching degree between the optical lens assembly and the chip, and meet the requirement for ultra-thin characteristics. The focal length and the field-of-view of the optical lens assembly are within a reasonable range to ensure the imaging quality of the optical lens assembly, while achieving miniaturization and high imaging quality. In the case of controlling the relationship among the height L of the lens barrel, the focal length f and the field-of-view FOV, the center thickness CT2 of the second lens is constrained, which may effectively reduce the incident light with poor quality on the edge of the image-side surface of the first lens and the useless light generated by the reflection in the first lens, and increase the uniformity of light distribution in all directions. While combining parameters such as the focal length f2 of the second lens, the air spacing T23 between the second lens and the third lens on the optical axis, the maximum thickness CP2 of the second spacer, the distance EP12 between the image-side surface of the first spacer and the object-side surface of the second spacer along the optical axis, it can effectively control an overall length of the optical lens assembly, at the same time reasonably constrain a field curvature of the system within a certain range, so that the optical lens assembly obtains more light intake and obtains better imaging effects, and it also helps to reasonably control the effective focal length f of the optical lens assembly, adjust the center thicknesses of the other lenses, and control the coma aberrations within a reasonable range, while reducing a volume of the optical lens assembly. Limiting CT2 and T23 may reduce the proportion of the positions of the second lens and the third lens in the optical system, so as to control the front part size of the optical lens assembly, improve the compactness of the structure of the optical lens assembly while ensuring good optical performance of the optical lens assembly, and further meeting the requirement for ultra-thin performance.

Preferably, the height L of the lens barrel, the focal length f of the optical lens assembly, and the maximal field-of-view FOV of the optical lens assembly satisfy: $1.3 < L/[f \times \tan(FOV/2)] < 1.4$; and the focal length f2 of the second lens, the center thickness CT2 of the second lens on the optical axis, the air spacing T23 between the second lens and the third lens on the optical axis, the maximum thickness CP2 of the second spacer, and the distance EP12 between the image-side surface of the first spacer and the object-side surface of the second spacer along the optical axis satisfy: $-40 < f2/(CT2+T23)+f2/(EP12+CP2) < -30$.

In this embodiment, at least one lens in the first to the fourth lenses has a positive refractive power, and the lens having a positive refractive power in the first to the fourth lens satisfies: $0.1 < fi/dis < 10.0$; where fi is an effective focal length of an ith lens, and dis is an inner diameter of an object-side surface of an ith spacer in contact with an image-side surface of the ith lens. Since the convergence and telephoto capabilities of lenses having positive refractive powers of different surface types and bending degrees are different, stray light situations are also different when passing through the lenses having different positive refractive powers, then by controlling a relationship between the inner diameter of the object-side surface of the spacer in contact with the image side of a lens having a positive refractive power and the focal length of this lens, it helps to reduce spherical ghost images generated at the image-side surface of the lens having a positive refractive power. At the same time, by controlling the number and position of the lens having a positive refractive power, it is conducive to improving a relative illumination of an off-axis field-of-view, and then by reasonable combining with the other lenses having different refractive powers, it may further realize the compactness of the structure of the optical lens assembly, at the same time it is conducive to correcting off-axis aberrations and improving the overall imaging quality of the system. Here, i takes a value from 1, 2, 3, or 4. Preferably, $0.9 < fi/dis < 10.0$.

In this embodiment, an absolute value of a focal length of at least one lens in the first to fourth lenses is less than 5, the lens having the absolute value of the focal length less than 5 and with an image-side surface in contact with a spacer satisfies: $0 < Djs/R2j-1 < 5.0$, where R2j-1 is a radius of curvature of an object-side surface of a jth lens, and Djs is an outer diameter of an object-side surface of a jth spacer in contact with an image-side surface of the jth lens. By controlling the absolute value of the focal length of the at least one lens being less than 5, an overall size of the optical lens assembly can be reduced, which is conducive to saving space and miniaturization of the optical lens assembly. At the same time, by controlling the ratio between the radius of curvature of the object-side surface of a lens having the absolute value of the focal length less than 5 and the outer diameter of the object-side surface of the spacer in contact with the image-side surface of this lens within a reasonable range, it may increase a light blocking area, effectively reduce stray light, at the same time reduce overall stray light of the optical lens assembly while ensuring the miniaturization of the optical lens assembly. Here, j takes a value from 1, 2, 3, or 4. Preferably, $0.3 < Djs/R2j-1 < 2.2$.

In this embodiment, the optical lens assembly satisfies: $10.0 < f1/(CP1+EP12)-f2/(CP2+EP12) < 50.0$, where f1 is an effective focal length of the first lens, f2 is the effective focal length of the second lens, CP1 is a thickness of the first spacer, CP2 is a thickness of the second spacer, EP12 is the distance between the image-side surface of the first spacer and the object-side surface of the second spacer on the optical axis. By controlling the effective focal length of the first lens and the effective focal length of the second lens within a reasonable range, the first lens and the second lens generate positive spherical aberrations, thus balancing negative spherical aberrations generated by other lenses, thereby controlling the entire optical lens assembly to have good imaging quality. At the same time, by combining CP1 with CP2, it may prevent structural components from protruding from the lens barrel under cooperation of limit tolerances during assembly of the last lens, reduce the risk of scratches on the surface of the lens, and ensure a yield of the optical lens assembly. The distance between the first spacer and the second spacer determines an edge thickness of the second lens, at the same time controlling the edge thickness of the second lens and the center thickness of the second lens within a reasonable range may ensure a form of the second lens, ensure a molding strength and assembly stability of the second lens, and effectively ensure the yield of the optical lens assembly. Preferably, $22 < f1/(CP1+EP12)-f2/(CP2+EP12) < 30$.

In this embodiment, the first to the fourth lenses satisfy: $-10.0 < (R2n+R2n+1)/dns < 70.0$, R2n is a radius of curvature of an image-side surface of a nth lens, R2n+1 is a radius of curvature of an object-side surface of a (n+1)th lens, dns is an inner diameter of an object-side surface of an nth spacer in contact with the image-side surface of the nth lens, and n takes a value from 1, 2, 3, or 4. Controlling a ratio of the radii of curvature of the opposite two surfaces of adjacent two lenses to the inner diameter of the spacer between the two within a certain range, can prevent excess light outside the effective diameters of the lenses from being reflected between the lenses one or more times, effectively reduce the generation of stray light and ghost images, at the same time can also control aberrations generated by the optical lens assembly at the fourth lens, effectively increase the imaging quality of the optical lens assembly. Preferably, $-9 < (R2n+R2n+1)/dns < 63$.

It should be noted that 2n+1 in R2n+1 is a mark number of R, not 2(n+1) nor (R2n)+1.

In this embodiment, the optical lens assembly further includes a fourth spacer in contact with an image-side surface of the fourth lens, a radius of curvature R2 of the image-side surface of the first lens, a radius of curvature R9 of an object-side surface of a fifth lens, an inner diameter d1s of an object-side surface of the first spacer, and an inner diameter d4s of an object-side surface of the fourth spacer satisfy: $1.0 < R2/d1s+R9/d4s < 10.0$. By controlling the radius of curvature of the image-side surface of the first lens and the radius of curvature of the image-side surface of the fifth lens within a reasonable range, a refraction angle of light in the corresponding lens can be reasonably controlled to reasonably control a relationship between the other lenses, so that cooperation between the lenses is more compact. At the same time, a size of the inner diameter of the object-side surface of the fourth spacer is controlled, which can effectively block a light path reflected through a small inclined surface by an edge mechanism of the effective diameter of the fourth lens close to the object side, so as to avoid the light path reaching the inside of the lens and forming stray light, and effectively reduce the generation of stray light. The first spacer may effectively block non-imaging light generated by the first lens to reduce the non-imaging light entering the subsequent optical system. Preferably, $4.0 < R2/d1s+R9/d4s < 5$.

In this embodiment, the optical lens assembly further includes a fourth spacer in contact with the image-side surface of the fourth lens, and a third spacer in contact with an image-side surface of the third lens, where a combined focal length f23 of the first lens and the second lens, a combined focal length f45 of the fourth lens and the fifth lens, a distance EP23 between an image-side surface of the second spacer and an object-side surface of the third spacer along the optical axis, and a distance EP34 between an image-side surface of the third spacer and the object-side surface of the fourth spacer along the optical axis satisfy: $-100.0 < f23/EP23+f45/EP34 < 110.0$. By controlling f23 and f45 within a reasonable range, it can control the amount of contribution of adjacent two lenses in the second to the fifth lens to aberrations, and balance aberrations generated by front-end optical elements, so that the aberrations of the optical lens assembly are in a reasonable horizontal state. At the same time, by controlling EP23 and EP34 within a reasonable range, the edge thickness of the third lens and the edge thickness of the fourth lens may be within a certain range, so that they can achieve an optimal molding structure within a certain range while reducing the overall length of the optical lens assembly. Preferably, $-70.0 < f23/EP23+f45/EP34 < 105$.

In this embodiment, the optical lens assembly further includes the fourth spacer in contact with the image-side surface of the fourth lens, the center thickness CT2 of the second lens on the optical axis, a center thickness CT3 of the third lens on the optical axis, a center thickness CT5 of the fifth lens on the optical axis, an outer diameter D2s of the object-side surface of the second spacer, and an outer diameter D4s of the object-side surface of the fourth spacer satisfy: $5.0 < D2s/(CT2+CT3)+D4s/(CT4+CT5) < 15.0$. By controlling a relationship between the center thicknesses of the second to the fifth lens and the outer diameter of the object-side surface of the second spacer and the outer diameter of the object-side surface of the fourth spacer, the amount of deformation of the lenses during assembly may be controlled. At the same time, it can ensure a structural strength of the lenses, so as to limit changes of the field curvature of the optical lens assembly to a certain range, so as to reduce sensitivity of the optical lens assembly and improve an assembly yield of the optical lens assembly. Preferably, $8 < D2s/(CT2+CT3)+D4s/(CT4+CT5) < 11$.

In this embodiment, an entrance pupil diameter EPD of the optical lens assembly, the inner diameter d1s of the object-side surface of the first spacer, the effective focal length f of the optical lens assembly, and the effective focal length f1 of the first lens satisfy: $5.0<(EPD+d1s)/(f-f1)<20.0$. By limiting $(EPD+d1s)/(f-f1)$ to a reasonable range, the entrance pupil diameter can be guaranteed under the condition that the optical lens assembly achieves a small head, and then sufficient aperture is guaranteed to obtain a required depth of field and illumination, at the same time it is conducive to correcting peripheral aberrations and improving the overall imaging quality of the optical lens assembly. Preferably, $10<(EPD+d1s)/(f-f1)<17$.

In this embodiment, a refractive power of the first lens and a refractive power of the second lens are positive-negative opposite (i.e., the first lens has a positive refractive power while the second lens a negative refractive power, or the first lens has a negative refractive power while the second lens a positive refractive power), and an absolute value of the effective focal length of the first lens is less than an absolute value of an effective focal length of the third lens. This setting is conducive for the second lens to balance aberrations generated by the first lens, ensuring the imaging quality of the optical lens assembly, controlling the amount of contribution of the lens to a fifth-order spherical aberration, and then compensating for a third-order spherical aberration generated by the lens, so that the system has good imaging quality on the axis.

In particular, the effective focal length f1 of the first lens, the effective focal length f2 of the second lens, and an effective focal length f3 of the third lens satisfy: $|f1/f3|<1.0$, $f1/f2<-0.01$. Preferably, $0.1≤|f1/f3|<0.5$; $-0.5<f1/f2<-0.3$.

In this embodiment, a radius of curvature R3 of an object-side surface of the second lens, a radius of curvature R4 of the image-side surface of the second lens, and a radius of curvature R6 of the image-side surface of the third lens, satisfy: $R3>R4$, $|R4|<|R6|$. By controlling sizes of the radii of curvature of the different lenses, a total deflection angle of an edge field-of-view on the two surfaces can be reasonably controlled within a reasonable range, which can effectively reduce the sensitivity of the optical lens assembly.

In this embodiment, absolute values of the radii of curvature of the first to the fourth lenses are greater than an absolute value of the radius of curvature of the image-side surface of the fifth lens. By restricting a relationship between the radii of curvature of the image-side surface of the first to the fourth lenses and the radius of curvature of the image-side surface of the fifth lens, it is more conducive to the imaging quality of light when passing through the first lens to the fourth lens, and reasonably controlling the radius of curvature of each lens, may make a light angle of the edge field-of-view within a reasonable range, which can effectively reduce the sensitivity of the optical lens assembly.

In particular, a radius of curvature R1 of an object-side surface of the first lens, the radius of curvature R2 of the image-side surface of the first lens, the radius of curvature R9 of the object-side surface of the fifth lens, and a radius of curvature R10 of the image-side surface of the fifth lens, satisfy: $R1/R9>0.1$, $R2/R10>1.0$. The absolute values of the radii of curvature of the first to the fourth lenses are greater than the absolute value of the radius of curvature of the image-side surface of the fifth lens, but is not necessarily greater than an absolute value of the radius of curvature of the object-side surface of the fifth lens, in order to increase the design freedom of the first lens to the fourth lens. Preferably, $0.5<R1/R9<1$, $5<R2/R10<9$.

Embodiment 2

As shown in FIG. 1 to FIG. 22, the optical lens assembly includes a lens barrel, five lenses (i.e., a first lens, a second lens, a third lens, a fourth lens, and a fifth lens, sequentially arranged along the optical axis of the optical lens assembly from the object side to the image side), a first spacer, and a second spacer, a center thickness of the second lens on the optical axis of is less than center thicknesses of other four lenses on the optical axis, and the center thickness CT2 of the second lens on the optical axis is less than 0.4 mm; the first spacer is in contact with at least part of an image-side surface of the first lens; the second spacer is in contact with at least part of an image-side surface of the second lens; a height L of the lens barrel, a focal length f of the optical lens assembly, and a maximal field-of-view FOV of the optical lens assembly satisfy: $1.2<L/[f×tan(FOV/2)]<1.6$; and an effective focal length f1 of the first lens, an effective focal length f2 of the second lens, a thickness CP1 of the first spacer, a thickness CP2 of the second spacer, and a distance EP12 between an image-side surface of the first spacer and an object-side surface of the second spacer on the optical axis satisfy: $10.0<f1/(CP1+EP12)-f2/(CP2+EP12)<50.0$.

By limiting $L/[f×tan(FOV/2)]$ to a reasonable range, the height L of the lens barrel, the focal length f of the optical lens assembly and the field-of-view may be mutual restrained, which may effectively reduce an incidence angle of the chief ray on the object side of the optical lens assembly, can improve a matching degree between the optical lens assembly and a chip, and meet the requirement for ultra-thin characteristics. The focal length and the field-of-view of the optical lens assembly are within a reasonable range to ensure the imaging quality of the optical lens assembly, while achieving miniaturization and high imaging quality. In the case of controlling the relationship among height L of the lens barrel, the focal length f and the field-of-view FOV, and at the same time in cooperation of CP1 and CP2, it may prevent structural components from protruding from the lens barrel under cooperation of limit tolerances during assembly of the last lens, reduce the risk of scratches on the surface of the lens, and ensure a yield of the optical lens assembly. The distance between the first spacer and the second spacer determines an edge thickness of the second lens, at the same time controlling the edge thickness of the second lens and the center thickness of the second lens within a reasonable range may ensure a form of the second lens, ensure a molding strength and assembly stability of the second lens, and effectively ensure the yield of the optical lens assembly. By controlling the effective focal length of the first lens and the effective focal length of the second lens within a reasonable range, the first lens and the second lens generate positive spherical aberrations, thus balancing negative spherical aberrations generated by other lenses, thereby controlling the entire optical lens assembly to have good imaging quality, improving the compactness of the structure of the optical lens assembly while ensuring good optical performance of the optical lens assembly, and further meeting the requirement for ultra-thin performance.

Preferably, $1.3<L/[f×tan(FOV/2)]<1.4$; $22<f1/(CP1+EP12)-f2/(CP2+EP12)<30$.

In this embodiment, at least one lens in the first to fourth lenses has a positive refractive power, and the lens having a positive refractive power satisfies: $0.1<fi/dis<10.0$; where fi is an effective focal length of an ith lens, and dis is an inner diameter of an object-side surface of an ith spacer in contact with an image-side surface of the ith lens. Since the convergence and telephoto capabilities of lenses having positive refractive powers of different surface types and bending degrees are different, stray light situations are also different when passing through the lenses having different positive refractive powers, then by controlling a relationship between the inner diameter of the object-side surface of the spacer in contact with the image side of a lens having a positive refractive power and the focal length of this lens, it helps to reduce spherical ghost images generated at the image-side surface of the lens having a positive refractive power. At the same time, by controlling the number and position of the lens having a positive refractive power, it is conducive to improving a relative illumination of an off-axis field-of-view, and then by reasonable cooperating with the other lenses having different refractive powers, it may further realize the compactness of the structure of the optical lens assembly, at the same time it is conducive to correcting off-axis aberrations and improving the overall imaging quality of the system. Here, i takes a value from 1, 2, 3, or 4. Preferably, $0.9 < fi/dis < 10.0$.

In this embodiment, an absolute value of a focal length of at least one lens in the first to fourth lenses is less than 5, the lens having the absolute value of the focal length less than 5 and with an image-side surface in contact with a spacer satisfies: $0 < Djs/R2j{-}1 < 5.0$, where $R2j{-}1$ is a radius of curvature of an object-side surface of a jth lens, and Djs is an outer diameter of an object-side surface of a jth spacer in contact with an image-side surface of the jth lens. By controlling the absolute value of the focal length of the at least one lens being less than 5, an overall size of the optical lens assembly can be reduced, which is conducive to saving space and miniaturization of the optical lens assembly. At the same time, by controlling the ration between the radius of curvature of the object-side surface of a lens having the absolute value of the focal length less than 5 and the outer diameter of the object-side surface of the spacer in contact with the image-side surface of this lens within a reasonable range, it may increase a light blocking area, effectively reduce stray light, at the same time improve overall stray light of the optical lens assembly while ensuring the miniaturization of the optical lens assembly. Here, j takes a value from 1, 2, 3, or 4. Preferably, $0.3 < Djs/R2j{-}1 < 2.2$.

In this embodiment, the first to the fourth lenses satisfy: $-10.0 < (R2n{+}R2n{+}1)/dns < 70.0$, R2n is a radius of curvature of an image-side surface of a nth lens, $R2n{+}1$ is a radius of curvature of an object-side surface of a $(n{+}1)$th lens, dns is an inner diameter of an object-side surface of an nth spacer in contact with the image-side surface of the nth lens, and n takes a value from 1, 2, 3, or 4. By controlling the radii of curvature of the opposite two surfaces of adjacent two lenses and the inner diameter of the spacer between the two within a certain range, it can prevent excess light outside the effective diameters of the lenses from being reflected between the lenses one or more times, effectively reduce the generation of stray light and ghost images, at the same time can also control aberrations generated by the optical lens assembly at the fourth lens, effectively increase the imaging quality of the optical lens assembly. Preferably, $-9 < (R2n{+}R2n{+}1)/dns < 63$.

It should be noted that $2n{+}1$ in $R2n{+}1$ is a mark number of R, not $2(n{+}1)$ nor $(R2n){+}1$.

In this embodiment, the optical lens assembly further includes a fourth spacer in contact with an image-side surface of the fourth lens, a radius of curvature R2 of the image-side surface of the first lens, a radius of curvature R9 of an object-side surface of a fifth lens, an inner diameter d1s of an object-side surface of the first spacer, and an inner diameter d4s of an object-side surface of the fourth spacer satisfy: $1.0 < R2/d1s{+}R9/d4s < 10.0$. By controlling the radius of curvature of the image-side surface of the first lens and the radius of curvature of the image-side surface of the fifth lens within a reasonable range, a refraction angle of light at the corresponding lens can be reasonably controlled, to reasonably control a relationship between the other lenses, so that cooperation between the lenses is more compact. At the same time, a size of the inner diameter of the object-side surface of the fourth spacer is controlled, which can effectively block a light path reflected through a small inclined surface by an edge part of the effective diameter of the fourth lens close to the object side, so as to avoid the light path reaching the inside of the lens and forming stray light, and effectively reduce the generation of stray light. The first spacer may effectively block non-imaging light generated by the first lens to reduce the non-imaging light entering the subsequent optical system. Preferably, $4.0 < R2/d1s{+}R9/d4s < 5$.

In this embodiment, the optical lens assembly further includes the fourth spacer in contact with the image-side surface of the fourth lens, and a third spacer in contact with an image-side surface of the third lens, a combined focal length f23 of the first lens and the second lens, a combined focal length f45 of the fourth lens and the fifth lens, a distance EP23 between an image-side surface of the second spacer and an object-side surface of the third spacer along the optical axis, and a distance EP34 between an image-side surface of the third spacer and the object-side surface of the fourth spacer along the optical axis satisfy: $-100.0 < f23/EP23{+}f45/EP34 < 110.0$. By controlling f23 and f45 within a reasonable range, it can control the amount of contribution of adjacent two lenses in the second to the fifth lenses to aberrations, and balance aberrations generated by front-end optical elements, so that the aberrations of the optical lens assembly are in a reasonable horizontal state. At the same time, by controlling EP23 and EP34 within a reasonable range, the edge thickness of the third lens and the edge thickness of the fourth lens may be within a certain range, so that they can achieve an optimal molding structure within a certain range while reducing the overall length of the optical lens assembly. Preferably, $-70.0 < f23/EP23{+}f45/EP34 < 105$.

In this embodiment, the optical lens assembly further includes the fourth spacer in contact with the image-side surface of the fourth lens, the center thickness CT2 of the second lens on the optical axis, a center thickness CT3 of the third lens on the optical axis, a center thickness CT5 of the fifth lens on the optical axis, an outer diameter D2s of the object-side surface of the second spacer, and an outer diameter D4s of the object-side surface of the fourth spacer, satisfy: $5.0 < D2s/(CT2{+}CT3){+}D4s/(CT4{+}CT5) < 15.0$. By controlling a relationship between the center thicknesses of the second to the fifth lenses and the outer diameter of the object-side surface of the second spacer and the outer diameter of the object-side surface of the fourth spacer, the amount of deformation of the lenses during assembly may be controlled. At the same time, it can ensure a structural strength of the lenses, so as to limit changes of the field curvature of the optical lens assembly to a certain range, so as to reduce sensitivity of the optical lens assembly and improve an assembly yield of the optical lens assembly. Preferably, $8 < D2s/(CT2{+}CT3){+}D4s/(CT4{+}CT5) < 11$.

In this embodiment, an entrance pupil diameter EPD of the optical lens assembly, the inner diameter d1s of the object-side surface of the first spacer, the effective focal length f of the optical lens assembly, and the effective focal length f1 of the first lens satisfy: $5.0 < (EPD{+}d1s)/(f{-}f1) < 20.0$. By limiting $(EPD{+}d1s)/(f{-}f1)$ to a reasonable range, the entrance pupil diameter can be guaranteed under the condition that the optical lens assembly achieves a small head, and then sufficient aperture is guaranteed to obtain a required depth of field and illumination, at the same time it is conducive to correcting peripheral aberrations and improving the overall imaging quality of the optical lens assembly. Preferably, 10<(EPD+d1s)/(f−f1)<17.

In this embodiment, a refractive power of the first lens and a refractive power of the second lens are positive-negative opposite, and an absolute value of the effective focal length of the first lens is less than an absolute value of an effective focal length of the third lens. This setting is conducive for the second lens to balance aberrations generated by the first lens, ensuring the imaging quality of the optical lens assembly, controlling the amount of contribution of the lens to a fifth-order spherical aberration, and then compensating for a third-order spherical aberration generated by the lens, so that the system has good imaging quality on the axis.

In this embodiment, the effective focal length f1 of the first lens, the effective focal length f2 of the second lens, and an effective focal length f3 of the third lens satisfy: |f1/f3|<1.0, f1/f2<−0.01. Preferably, 0.1<|f1/f3|<0.5; −0.5<f1/f2<−0.3.

In this embodiment, a radius of curvature R3 of an object-side surface of the second lens, a radius of curvature R4 of the image-side surface of the second lens, and a radius of curvature R6 of the image-side surface of the third lens satisfy: R3>R4, |R4|<|R6|. By controlling sizes of the radii of curvature of the different lenses, a total deflection angle of an edge field-of-view on the two surfaces can be reasonably controlled within a reasonable range, which can effectively reduce the sensitivity of the optical lens assembly.

In this embodiment, absolute values of the radii of curvature of the first to fourth lenses each is greater than an absolute value of the radius of curvature of the image-side surface of the fifth lens. By restricting a relationship between the radii of curvature of the image-side surfaces of the first to fourth lenses and the radius of curvature of the image-side surface of the fifth lens, it is more conducive to the imaging quality of light when passing through the first lens to the fourth lens, and reasonably controlling the radius of curvature of each lens, may make a light angle of the edge field-of-view within a reasonable range, which can effectively reduce the sensitivity of the optical lens assembly.

In particular, a radius of curvature R1 of an object-side surface of the first lens, the radius of curvature R2 of the image-side surface of the first lens, the radius of curvature R9 of the object-side surface of the fifth lens, and a radius of curvature R10 of the image-side surface of the fifth lens, satisfy: R1/R9>0.1, R2/R10>10.0. The absolute values of the radii of curvature of the first to fourth lenses each is greater than the absolute value of the radius of curvature of the image-side surface of the fifth lens, but is not necessarily greater than an absolute value of the radius of curvature of the object-side surface of the fifth lens, in order to increase the design freedom of the first lens to the fourth lens. Preferably, 0.5<R1/R9<1, 5<R2/R10<9.

The optical lens assembly in the present disclosure may use a plurality of lenses and a plurality of spacers, for example, the above five lenses. By reasonably distributing the effective focal lengths, the surface types of the lenses, the center thicknesses of the lenses, the axial spacing between the lenses, the inner diameters and the outer diameters of the spacers, etc., it may effectively increase the imaging quality of the optical lens assembly, reduce the sensitivity of the lens assembly, and improve the processability of the lens assembly, so that the optical lens assembly is more conducive to production and processing, and may be applied to portable electronic devices such as smartphones.

In the present disclosure, at least one of the surfaces of the lenses is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical lens assembly without departing from the technical solution claimed by the present disclosure. For example, although the optical lens assembly having five lenses is described as an example in the implementations, the optical lens assembly is not limited to including the five lenses. If desired, the optical lens assembly may also include other numbers of lenses.

FIG. 1 shows a schematic structural diagram of an optical lens assembly of the present disclosure. Parameters such as d1s, D1S, and D1m are also marked in FIG. 1 to clearly and intuitively understand the meaning of the parameters. In order to facilitate the display of the structure of the optical lens assembly and the specific surface type, these parameters are no longer reflected in the accompanying drawings when specific examples are described later.

In the present disclosure, Dis denotes an outer diameter of the object-side surface of the ith spacer, dis denotes the inner diameter of the object-side surface of the ith spacer, Dim denotes an outer diameter of an image-side surface of the ith spacer, dim denotes an inner diameter of the image-side surface of the ith spacer, and CPi denotes a maximum thickness of the ith spacer, where i takes a value from 1, 2, 3, or 4. EPij denotes a distance between an image-side surface of the ith spacer and an object-side surface of the jth spacer along the optical axis, where j>i, i takes a value from 1, 2, or 3. It should be noted that the distance between the object-side surface and the image-side surface of the spacer in an extension direction of the optical axis has a maximum value, which is not infinite. The maximum thickness refers to a maximum distance between the object-side surface and the image-side surface of the spacer in the extension direction of the optical axis.

The following further describes examples of specific surface types and parameters of the optical lens assembly that may be applied to the above implementations with reference to the accompanying drawings.

It should be noted that in the following examples, there are a first state, a second state and a third state. In the same example, the parameters such as the radii of curvature of the first to fifth lenses, the center thicknesses of the first to fifth lenses, the spacing distances between adjacent lenses in the first to fifth lenses, and high order coefficients of the optical lens assembly remain same in the first state, in the second state, and in the third state.

However, the parameters such as the lens barrel 10, the thickness of the spacer, the inner diameter of the spacer and the outer diameter of the spacer, and the distance between the spacers are different in the first, second and third states of the same example, and shapes of some lenses are different. Or, a main structure used for imaging is the same in the three states, while an auxiliary structure used for imaging is different in the three states.

P1, the second spacer P2, and the third spacer P3 each is less than an inner diameter of the fourth spacer P4, and a supporting area between the fourth lens E4 and the fourth spacer P4 is less than a supporting area between the fifth lens E5 and the fourth spacer P4, so as to facilitate stable supporting of the overall optical lens assembly.

An object-side surface S1 of the first lens is a convex surface, and an image-side surface S2 of the first lens is a concave surface. An object-side surface S3 of the second lens is a convex surface, and an image-side surface S4 of the second lens is a concave surface. An object-side surface S5 of the third lens is a convex surface, and an image-side surface S6 of the third lens is a convex surface. An object-side surface S7 of the fourth lens is a concave surface, and an image-side surface S8 of the fourth lens is a convex surface. An object-side surface S9 of the fifth lens is a convex surface, and an image-side surface S10 of the fifth lens is a concave surface.

In this example, an effective focal length f of the optical lens assembly is 3.78 mm.

Table 1 shows a table of basic structure parameters of the optical lens assembly in Example I. Here, the units of a radius of curvature, and a thickness/distance are millimeters (mm).

TABLE 1

| surface number | surface type | radius of curvature | thickness | material | | conic coefficient |
|---|---|---|---|---|---|---|
| OBJ | spherical | infinite | infinite | refractive index | abbe number | |
| STO | spherical | infinite | −0.3548 | | | |
| S1 | aspheric | 1.5618 | 0.6421 | 1.55 | 56.1 | −0.3874 |
| S2 | aspheric | 7.2943 | 0.0592 | | | 38.1635 |
| S3 | aspheric | 4.6811 | 0.2540 | 1.67 | 20.4 | −19.8493 |
| S4 | aspheric | 2.5512 | 0.2486 | | | 1.9431 |
| S5 | aspheric | 7.1895 | 0.4482 | 1.55 | 56.1 | 49.4870 |
| S6 | aspheric | −8.8436 | 0.5209 | | | −96.7211 |
| S7 | aspheric | −5.2357 | 0.8266 | 1.67 | 20.4 | 17.9717 |
| S8 | aspheric | −5.5875 | 0.0598 | | | 8.6317 |
| S9 | aspheric | 2.6850 | 0.6750 | 1.54 | 55.9 | −15.5930 |
| S10 | aspheric | 1.2822 | 0.3748 | | | −5.4976 |
| S11 | spherical | infinite | 0.2100 | 1.52 | 64.2 | |
| S12 | spherical | infinite | 0.2940 | | | |
| S13 | spherical | infinite | | | | |

It should be noted that any example of the following Example I to Example III applies to all embodiments of the present disclosure.

Example I

Figure 2:
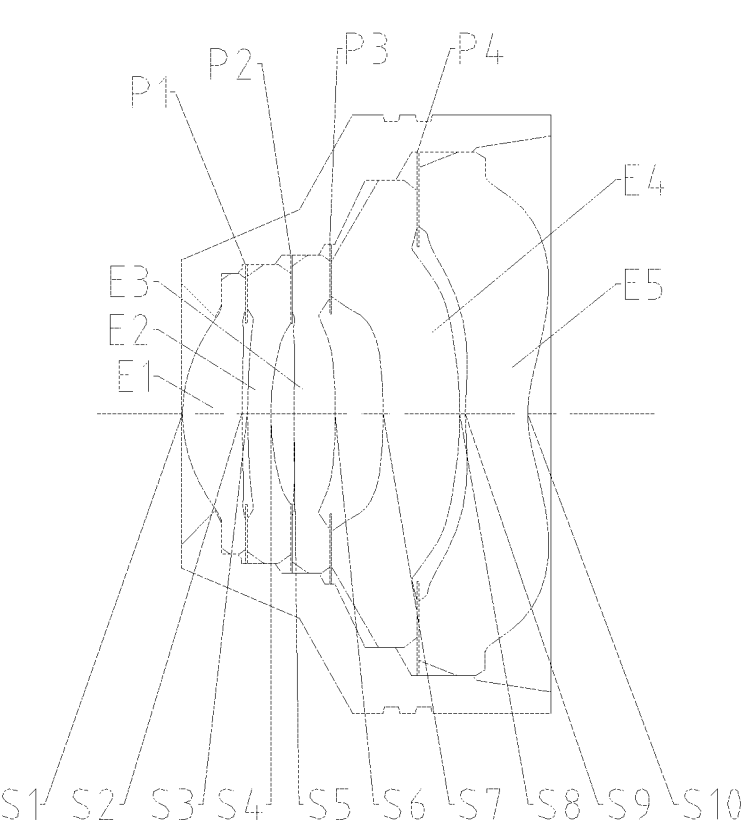
Figure 3:
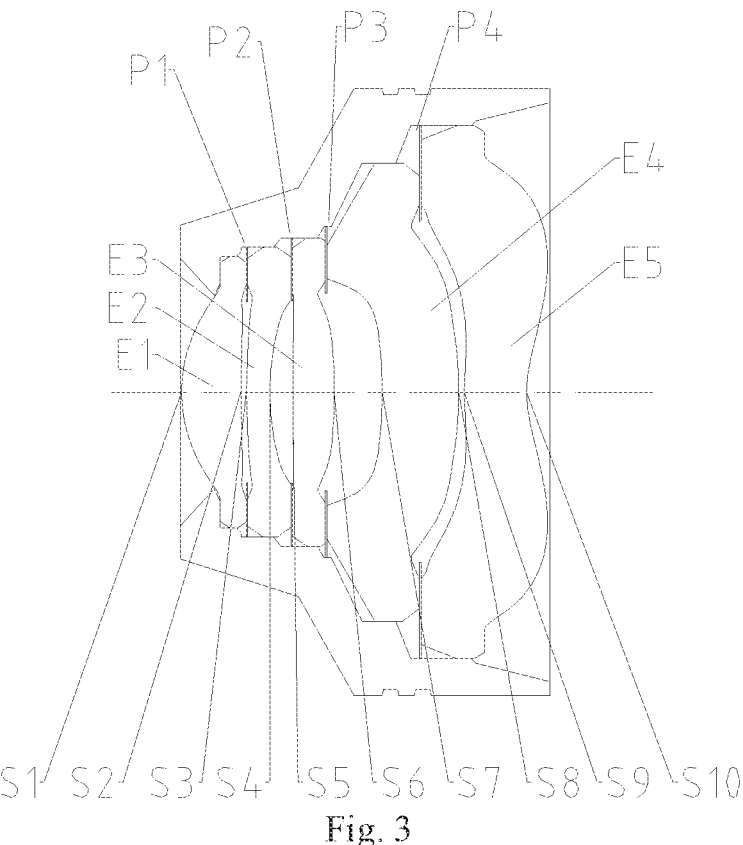

As shown in FIGS. 2-8, an optical lens assembly in Example I of the present disclosure is described. FIG. 2 shows a schematic structural diagram of the optical lens assembly in Example I in the first state, FIG. 3 shows a schematic structural diagram of the optical lens assembly in Example I in the second state, and FIG. 4 shows a schematic structural diagram of the optical lens assembly in Example I in the third state.

As shown in FIGS. 2-4, the optical lens assembly from an object side to an image side sequentially includes: a first lens E1, a first spacer P1, a second lens E2, a second spacer P2, a third lens E3, a third spacer P3, a fourth lens E4, a fourth spacer P4, a fifth lens E5. An object-side surface and an image-side surface of an ith spacer are in contact with two adjacent lenses, which is conducive to assembly stability of the optical lens assembly. Outer diameters of the first spacer In Example I, both the object-side surface and the image-side surface of any lens in the first lens E1 to the fifth lens E6 are aspheric surfaces, and the surface type of each aspheric lens may be defined using, but not limited to, the following aspheric formula:

$$x = \frac{ch^2}{1 + \sqrt{1 - (k-1)c^2h^2}} + \sum Aih^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 below give the high-order coefficients $A_4$, $A_6$, $A_8$, $A_{10}$, $A_{12}$, $A_{14}$, $A_{16}$, $A_{18}$, $A_{20}$ applicable to the aspheric surfaces S1 to S10 in Example I.

TABLE 2

| Surface number | A4 | A6 | A8 | A10 | A12 |
|---|---|---|---|---|---|
| S1 | 3.0886E−03 | −3.2859E−03 | −1.3640E−03 | −2.8364E−04 | −1.0861E−04 |
| S2 | −8.6043E−02 | 2.4348E−03 | −4.7951E−03 | −2.7836E−04 | −4.5626E−04 |
| S3 | −3.5597E−02 | 1.6848E−02 | −5.0426E−03 | −7.7764E−04 | −1.0068E−03 |
| S4 | −2.2021E−02 | 1.2977E−02 | 1.2002E−03 | 8.2815E−04 | 1.5226E−04 |
| S5 | −1.0264E−01 | 4.8769E−04 | 4.1815E−03 | 2.1028E−03 | 5.4344E−04 |
| S6 | −1.2998E−01 | −5.6520E−03 | 4.1977E−03 | 1.7941E−03 | 8.7870E−04 |
| S7 | −1.1160E−01 | −4.6644E−02 | −5.3834E−03 | −2.0646E−03 | −5.1351E−04 |
| S8 | −9.4714E−02 | −1.0467E−02 | 4.0816E−03 | 1.3085E−02 | −4.2482E−03 |
| S9 | −1.1356E+00 | 3.6295E−01 | −5.5610E−02 | 2.9920E−02 | −2.4731E−02 |
| S10 | −1.5139E+00 | 9.6701E−02 | −6.0620E−02 | 4.0822E−02 | 9.0176E−03 |

| Surface number | A14 | A16 | A18 | A20 |
|---|---|---|---|---|
| S1 | −4.7285E−06 | −2.1176E−05 | 1.2084E−07 | −1.0423E−05 |
| S2 | −1.4550E−04 | −5.8825E−05 | −1.6703E−05 | 5.8773E−06 |
| S3 | −4.4227E−04 | −1.8328E−04 | −5.9111E−05 | −7.1460E−06 |
| S4 | −8.9630E−06 | −3.3809E−05 | −3.1739E−05 | −1.1254E−05 |
| S5 | 4.1051E−05 | −1.1415E−04 | −6.8890E−05 | −4.0711E−05 |
| S6 | 3.3539E−04 | 1.7081E−04 | 5.3812E−05 | 3.2668E−05 |
| S7 | −4.0547E−04 | −1.4991E−04 | −1.2518E−04 | −2.6182E−05 |
| S8 | 1.9968E−03 | −3.4085E−04 | −4.8897E−05 | 1.5076E−04 |
| S9 | 7.8100E−03 | −1.7662E−03 | 4.1692E−03 | 1.3557E−03 |
| S10 | 1.6595E−02 | 4.4027E−03 | 2.2218E−03 | 2.2552E−04 |

FIG. 5 illustrates a longitudinal aberration curve of the optical lens assembly according to Example I, representing deviations of focal points of light of different wavelengths converged after passing through the optical lens assembly. FIG. 6 illustrates an astigmatic curve of the optical lens assembly according to Example I, representing a curvature of a tangential image plane and a curvature of a sagittal image plane. FIG. 7 illustrates a distortion curve of the optical lens assembly according to Example I, representing amounts of distortion corresponding to different field-of-view. FIG. 8 illustrates a lateral color curve of the optical lens assembly according to Example I, representing deviations of different image heights on the image plane formed by light passing through the optical lens assembly.

It can be seen from FIGS. 5-8 that the optical lens assembly given in Example I can achieve a good imaging quality.

Example II

Figure 10:
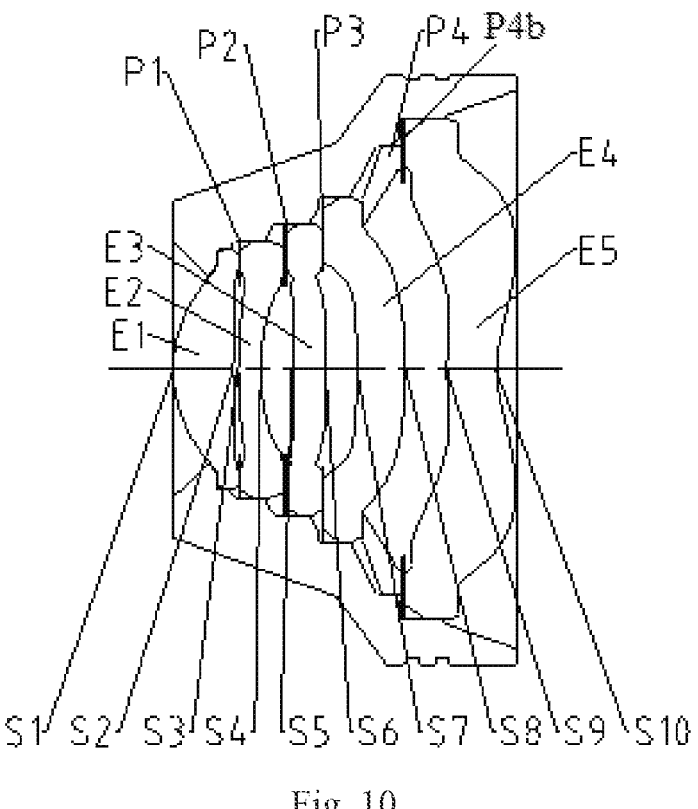
Figure 11:
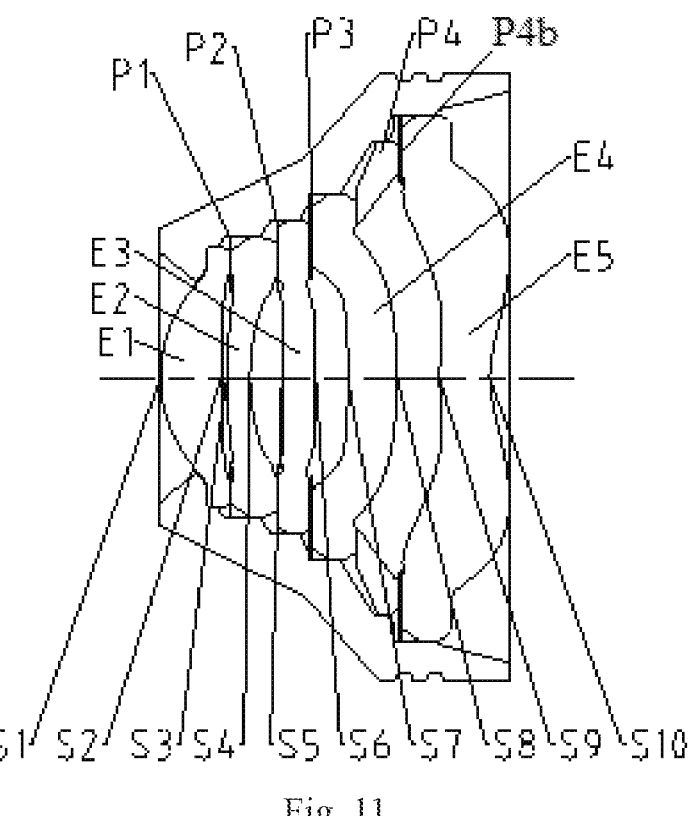

As shown in FIGS. 9-15, an optical lens assembly in Example II of the present disclosure is described. FIG. 9 shows a schematic structural diagram of the optical lens assembly in Example II in the first state, FIG. 10 shows a schematic structural diagram of the optical lens assembly in Example II in the second state, and FIG. 11 shows a schematic structural diagram of the optical lens assembly in Example II in the third state. For the sake of brevity, some descriptions similar to those in Example I will be omitted.

As shown in FIGS. 9-11, the optical lens assembly from an object side to an image side sequentially includes: a first lens E1, a first spacer P1, a second lens E2, a second spacer P2, a third lens E3, a third spacer P3, a fourth lens E4, a fourth spacer P4, a fourth auxiliary spacer P4b, a fifth lens E5. There is only one spacer between adjacent lenses in the first to fourth lenses, which is in contact with the adjacent lenses to ensure assembly stability of the optical lens assembly. There are two spacers between the fourth lens E4 and the fifth lens E5, an image-side surface of the fourth lens E4 is in contact with the fourth spacer, an object-side surface of the fifth lens E5 is in contact with the fourth auxiliary spacer P4b, an outer diameter of the third spacer P3 is greater than an inner diameter of an object-side surface of the fourth spacer P4, and is less than an inner diameter of the fourth auxiliary spacer P4b, and a thickness of the fourth spacer P4 is the largest, to achieve a segment difference at the fourth lens E4 and the fifth lens E5.

An object-side surface S1 of the first lens is a convex surface, and an image-side surface S2 of the first lens is a concave surface. An object-side surface S3 of the second lens is a convex surface, and an image-side surface S4 of the second lens is a concave surface. An object-side surface S5 of the third lens is a convex surface, and an image-side surface S6 of the third lens is a concave surface. An object-side surface S7 of the fourth lens is a concave surface, and the image-side surface S8 of the fourth lens is a convex surface. The object-side surface S9 of the fifth lens is a convex surface, and an image-side surface S10 of the fifth lens is a concave surface.

In this example, an effective focal length f of the optical lens assembly is 3.85 mm.

Table 3 shows a table of basic structure parameters of the optical lens assembly in Example II. Here, the units of a radius of curvature, and a thickness/distance are millimeters (mm).

TABLE 3

| surface number | surface type | radius of curvature | thickness | material | | conic coefficient |
|---|---|---|---|---|---|---|
| OBJ | spherical | infinite | infinite | refractive index | abbe number | |
| STO | spherical | infinite | −0.4176 | | | |
| S1 | aspheric | 1.5351 | 0.7029 | 1.55 | 56.1 | −0.2603 |
| S2 | aspheric | 6.7962 | 0.0586 | | | 39.2373 |

TABLE 3-continued

| surface number | surface type | radius of curvature | thickness | material | | conic coefficient |
|---|---|---|---|---|---|---|
| S3 | aspheric | 3.9312 | 0.2646 | 1.67 | 20.4 | −18.5651 |
| S4 | aspheric | 2.3310 | 0.3713 | | | 2.0986 |
| S5 | aspheric | 7.6054 | 0.3868 | 1.55 | 56.1 | 49.5583 |
| S6 | aspheric | 19.8240 | 0.3700 | | | −43.3688 |
| S7 | aspheric | −32.2782 | 0.5694 | 1.67 | 20.4 | 99.0000 |
| S8 | aspheric | −7.1095 | 0.4850 | | | 11.2196 |
| S9 | aspheric | 2.4773 | 0.5798 | 1.54 | 55.9 | −19.2122 |
| S10 | aspheric | 1.1857 | 0.3153 | | | −5.8342 |
| S11 | spherical | infinite | 0.2100 | 1.52 | 64.2 | |
| S12 | spherical | infinite | 0.2365 | | | |
| S13 | spherical | infinite | 0.0000 | | | |

Table 4 show the high-order coefficients applicable to the aspheric surfaces S1 to S10 in Example II. Here, the surface type of each aspheric surface may be defined using the formula (1) given in the above Example I.

TABLE 4

| surface number | A4 | A6 | A8 | A10 | A12 |
|---|---|---|---|---|---|
| S1 | 1.2430E−02 | −2.8152E−04 | −6.6131E−04 | −2.5249E−04 | −9.1243E−05 |
| S2 | −7.7377E−02 | 4.8917E−03 | −4.4153E−03 | 2.3163E−04 | −2.6043E−04 |
| S3 | −3.4191E−02 | 1.4536E−02 | −3.2798E−03 | 6.7902E−04 | −1.3829E−04 |
| S4 | −2.0354E−02 | 1.0794E−02 | 1.6618E−04 | 5.0235E−04 | 5.6546E−05 |
| S5 | −1.1520E−01 | 5.0547E−03 | 3.9277E−03 | 1.6421E−04 | 1.4013E−04 |
| S6 | −1.4404E−01 | 1.6624E−03 | 6.7356E−03 | 3.6824E−03 | 1.2742E−03 |
| S7 | −2.2790E−01 | −5.1047E−02 | −8.0689E−03 | 2.1049E−03 | 1.5759E−03 |
| S8 | −2.5074E−01 | −7.8997E−03 | 3.2674E−03 | 1.0388E−02 | −2.7305E−03 |
| S9 | −1.1500E+00 | 4.0009E−01 | −8.7670E−02 | 3.3195E−02 | −1.7341E−02 |
| S10 | −1.4476E+00 | 9.2182E−02 | −4.7937E−02 | 4.8132E−02 | 7.0324E−04 |

| surface number | A14 | A16 | A18 | A20 |
|---|---|---|---|---|
| S1 | −2.1999E−05 | −9.5720E−06 | −1.6729E−06 | −2.5344E−06 |
| S2 | −1.9245E−05 | −2.2082E−05 | −1.1063E−05 | −3.6232E−06 |
| S3 | −3.9528E−06 | −7.8283E−06 | −5.5518E−06 | 1.3059E−07 |
| S4 | −3.5131E−06 | −3.8416E−06 | −8.8233E−06 | −8.2152E−08 |
| S5 | −1.2574E−04 | −1.4277E−04 | −4.3896E−05 | −2.0329E−05 |
| S6 | 5.2323E−04 | 1.3670E−04 | 4.3309E−05 | 5.7417E−06 |
| S7 | 9.7538E−04 | 3.8689E−04 | 1.2597E−04 | 2.9108E−05 |
| S8 | −2.2189E−04 | −5.3993E−04 | −1.0674E−04 | −7.7688E−05 |
| S9 | 4.8039E−03 | −3.9380E−04 | 1.8994E−04 | −1.4143E−04 |
| S10 | 7.5132E−03 | 5.0404E−04 | 6.5697E−04 | −4.4028E−04 |

FIG. 12 illustrates a longitudinal aberration curve of the optical lens assembly according to Example II, representing deviations of focal points of light of different wavelengths converged after passing through the optical lens assembly. FIG. 13 illustrates an astigmatic curve of the optical lens assembly according to Example II, representing a curvature of a tangential image plane and a curvature of a sagittal image plane. FIG. 14 illustrates a distortion curve of the optical lens assembly according to Example II, representing amounts of distortion corresponding to different field-of-view. FIG. 15 illustrates a lateral color curve of the optical lens assembly according to Example II, representing deviations of different image heights on the image plane formed by light passing through the optical lens assembly.

It can be seen from FIGS. 12-15 that the optical lens assembly given in Example II can achieve a good imaging quality.

Example III

Figure 16:
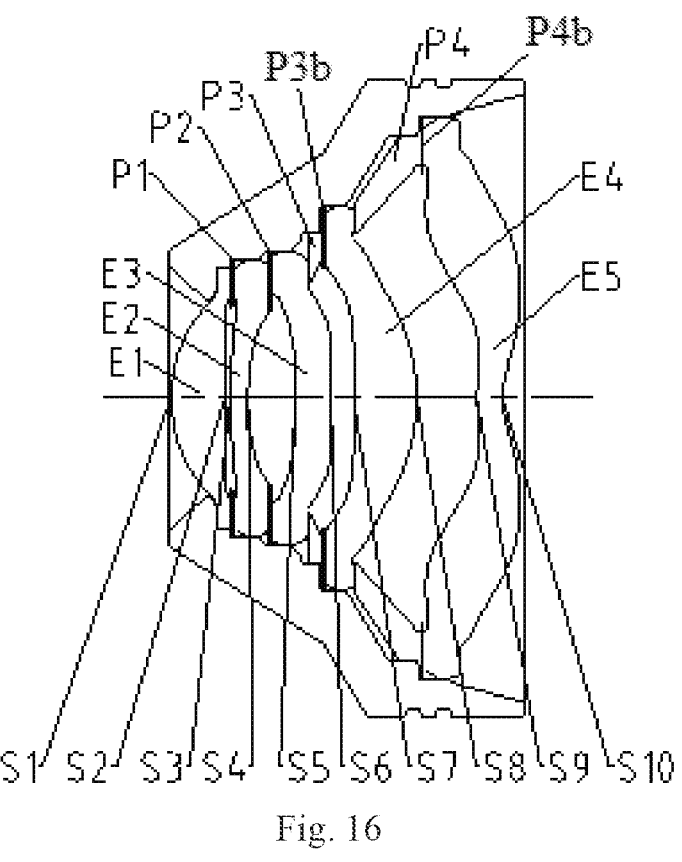
Figure 17:
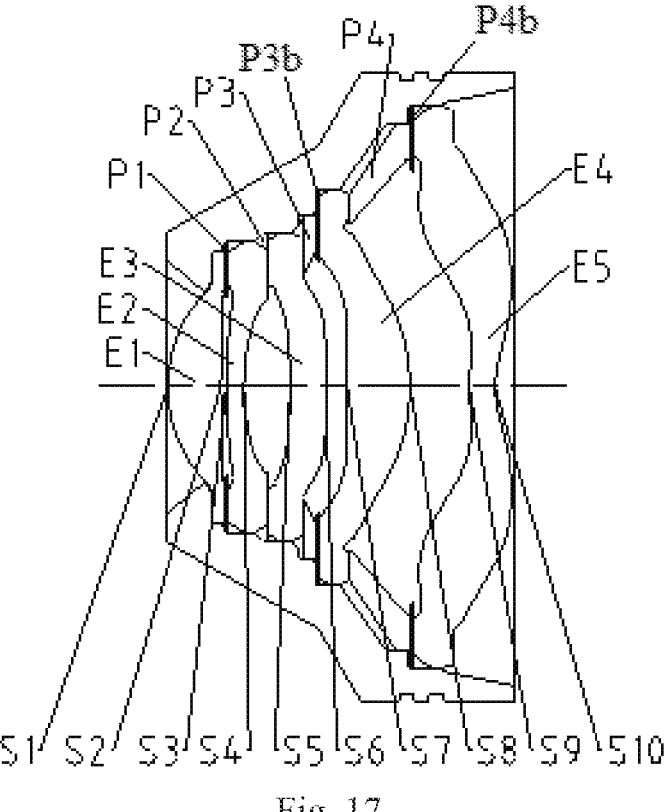

As shown in FIGS. 16-22, an optical lens assembly in Example III of the present disclosure is described. FIG. 16 shows a schematic structural diagram of the optical lens assembly in Example III in the first state, FIG. 17 shows a schematic structural diagram of the optical lens assembly in Example III in the second state, and FIG. 18 shows a schematic structural diagram of the optical lens assembly in Example III in the third state. For the sake of brevity, some descriptions similar to those in Example I will be omitted.

As shown in FIGS. 16-18, the optical lens assembly from an object side to an image side sequentially includes: a first lens E1, a first spacer P1, a second lens E2, a second spacer P2, a third lens E3, a third spacer P3, a third auxiliary spacer P3b, a fourth lens E4, a fourth spacer P4, a fourth auxiliary spacer P4b, a fifth lens E5. There is only one spacer between adjacent lenses in the first to fifth lenses, which is in contact with the adjacent lenses to ensure assembly stability of the optical lens assembly. There are two spacers between the third lens E3 and the fourth lens E4, an image-side surface of the third lens E3 is in contact with the third spacer, an object-side surface of the fourth lens E4 is in contact with the third auxiliary spacer P3b; outer diameters of the first spacer P1 and the second spacer P2 each is greater than an inner diameter of the third spacer P3; a thickness of the third spacer P3 is greater than a thickness of the first spacer P1, a thickness of the second spacer P3 and a thickness of the third auxiliary spacer P3b; and an inner diameter of the third auxiliary spacer P3*b* is greater than an inner diameter of an object-side surface of the third spacer P3, and is less than an inner diameter of an image-side surface of the third spacer P3, which is conducive to the absorption of stray light by the third auxiliary spacer P3*b*. There are two spacers between the fourth lens E4 and the fifth lens E5, an image-side surface of the fourth lens E4 is in contact with the fourth spacer P4, an object-side surface of the fifth lens E5 is in contact with the fourth auxiliary spacer P4*b*; an outer diameter of the third auxiliary spacer P3*b* is greater than an inner diameter of an object-side surface of the fourth spacer P4, and is less than an inner diameter of the fourth auxiliary spacer P4*b*; and a thickness of the fourth spacer P4 is greater than the thickness of the third spacer P3, to achieve a segment difference at the fourth lens E4 and the fifth lens E5.

An object-side surface S1 of the first lens is a convex surface, and an image-side surface S2 of the first lens is a concave surface. An object-side surface S3 of the second lens is a convex surface, and an image-side surface S4 of the second lens is a concave surface. An object-side surface S5 of the third lens is a convex surface, and the image-side surface S6 of the third lens is a concave surface. The object-side surface S7 of the fourth lens is a convex surface, and the image-side surface S8 of the fourth lens is a convex surface. The object-side surface S9 of the fifth lens is a convex surface, and an image-side surface S10 of the fifth lens is a concave surface.

In this example, an effective focal length f of the optical lens assembly is 3.78 mm.

Table 5 shows a table of basic structure parameters of the optical lens assembly in Example III. Here, the units of a radius of curvature, and a thickness/distance are millimeters (mm).

TABLE 5

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.4347 | | | |
| S1 | aspheric | 1.5674 | 0.6234 | 1.55 | 56.1 | −0.1289 |
| S2 | aspheric | 7.2556 | 0.0662 | | | 37.3845 |
| S3 | aspheric | 3.9511 | 0.2000 | 1.67 | 20.4 | −30.9415 |
| S4 | aspheric | 2.3163 | 0.5496 | | | 2.1737 |
| S5 | aspheric | 118.5046 | 0.4138 | 1.55 | 56.1 | −99.0001 |
| S6 | aspheric | 9.6915 | 0.2600 | | | −99.0000 |
| S7 | aspheric | 11.9859 | 0.7319 | 1.55 | 56.1 | −30.6781 |
| S8 | aspheric | −2.2999 | 0.6950 | | | 0.2097 |
| S9 | aspheric | 1.9822 | 0.2990 | 1.54 | 55.9 | −21.2848 |
| S10 | aspheric | 0.9065 | 0.2970 | | | −4.9368 |
| S11 | spherical | infinite | 0.2100 | 1.52 | 64.2 | |
| S12 | spherical | infinite | 0.3498 | | | |
| S13 | spherical | infinite | 0.0090 | | | |

Table 6 show the high-order coefficients applicable to the aspheric surfaces S1 to S10 in Example III. Here, the surface type of each aspheric surface may be defined using the formula (1) given in the above Example I.

TABLE 6

| surface number | A4 | A6 | A8 | A10 | A12 | A14 |
|---|---|---|---|---|---|---|
| S1 | 2.0836E−02 | 8.8123E−04 | −9.6660E−04 | −5.1659E−04 | −2.4953E−04 | −9.3427E−05 |
| S2 | −8.2078E−02 | 8.1377E−03 | −5.4284E−03 | 4.7554E−04 | −3.9796E−04 | −8.3074E−06 |
| S3 | −3.6902E−02 | 1.9294E−02 | −4.5968E−03 | 1.1187E−03 | −2.8660E−04 | 6.5837E−06 |
| S4 | −2.1288E−02 | 1.4134E−02 | −3.6709E−04 | 7.1535E−04 | 4.6951E−05 | 7.9862E−06 |
| S5 | −1.8864E−01 | 7.9165E−03 | 6.5653E−03 | 3.9378E−03 | 1.0690E−03 | 9.9207E−05 |
| S6 | −3.4964E−01 | 1.3354E−02 | 1.2908E−02 | 7.2041E−03 | 2.4551E−03 | 6.4908E−04 |
| S7 | −4.1281E−01 | 1.8450E−03 | 9.7362E−03 | 4.5648E−04 | −5.8104E−04 | 2.8804E−04 |
| S8 | 1.6983E−01 | 7.8763E−02 | −2.0446E−02 | −1.4443E−02 | −2.4006E−03 | 1.5294E−03 |
| S9 | −1.5841E+00 | 8.0514E−01 | −3.2938E−01 | 1.0114E−01 | −3.0462E−02 | 1.1906E−02 |
| S10 | −1.9822E+00 | 4.7307E−01 | −1.1529E−01 | 5.2504E−02 | −4.3697E−02 | 8.7038E−03 |

| surface number | A16 | A18 | A20 | A22 | A24 | A26 |
|---|---|---|---|---|---|---|
| S1 | −4.4783E−05 | −1.2544E−05 | −3.4999E−06 | 4.3072E−06 | 7.7168E−08 | 0.0000E+00 |
| S2 | −3.0874E−05 | −9.2967E−06 | 1.1450E−06 | 3.7226E−06 | 4.6857E−06 | 1.1178E−06 |
| S3 | −6.0585E−06 | −3.7736E−06 | 5.0756E−06 | 3.2250E−06 | 1.3685E−06 | 0.0000E+00 |
| S4 | 4.8719E−06 | −9.8013E−06 | 6.2131E−07 | −1.1835E−06 | 9.3921E−07 | 0.0000E+00 |
| S5 | −1.4484E−04 | −8.3652E−05 | −3.7690E−05 | 1.4871E−06 | −2.7722E−06 | 0.0000E+00 |
| S6 | 2.6122E−05 | −1.0934E−04 | −6.6606E−05 | −2.9422E−05 | 4.5805E−06 | 0.0000E+00 |
| S7 | −1.9961E−04 | −4.4945E−04 | −3.5791E−04 | −1.3767E−04 | −2.6681E−05 | 0.0000E+00 |
| S8 | −1.1914E−03 | −1.3439E−03 | −6.1668E−04 | −3.5754E−05 | 2.9246E−06 | 0.0000E+00 |
| S9 | −4.6225E−03 | 3.7728E−04 | 1.9130E−04 | 9.4372E−05 | −3.4690E−04 | 0.0000E+00 |
| S10 | −2.7961E−04 | 3.8417E−03 | −2.0615E−03 | −5.6528E−04 | −4.2176E−04 | 0.0000E+00 |

Figures 21, 22:
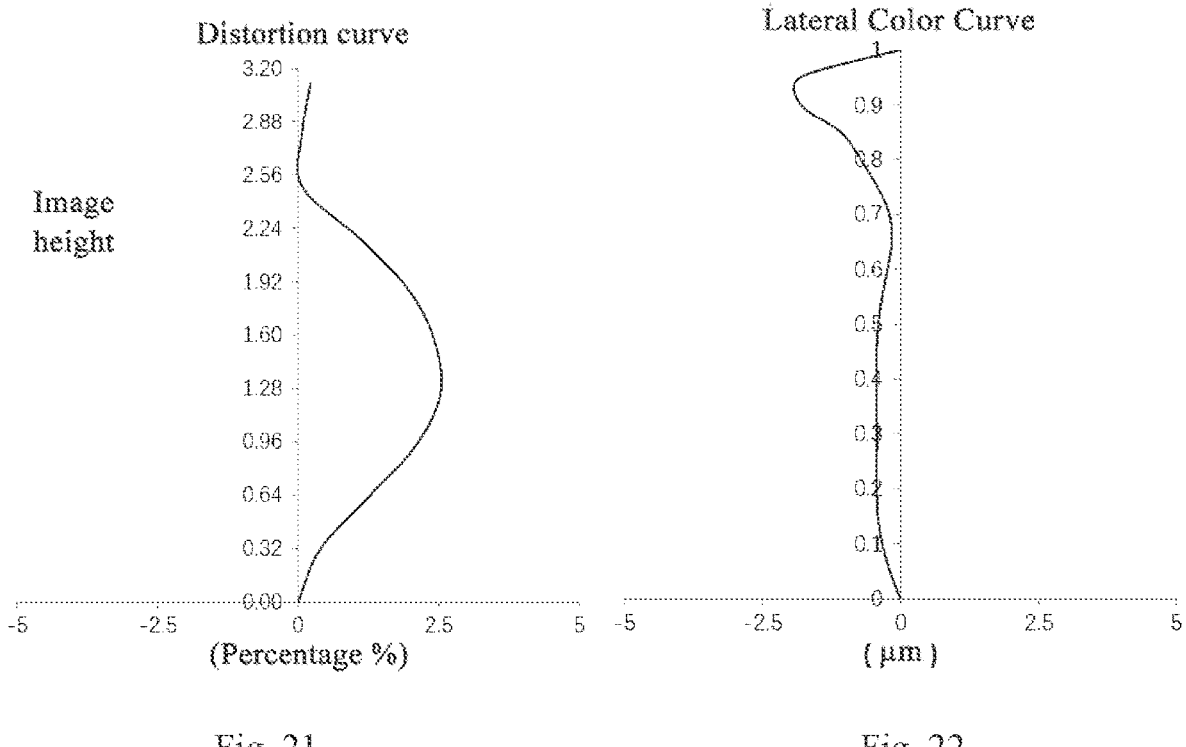

FIG. 19 illustrates a longitudinal aberration curve of the optical lens assembly according to Example III, representing deviations of focal points of light of different wavelengths converged after passing through the optical lens assembly. FIG. 20 illustrates an astigmatic curve of the optical lens assembly according to Example III, representing a curvature of a tangential image plane and a curvature of a sagittal image plane. FIG. 21 illustrates a distortion curve of the optical lens assembly according to Example III, representing amounts of distortion corresponding to different field-of-view. FIG. 22 illustrates a lateral color curve of the optical lens assembly according to Example III, representing deviations of different image heights on the image plane formed by light passing through the optical lens assembly.

It can be seen from FIGS. 19-22 that the optical lens assembly given in Example III can achieve a good imaging quality.

In summary, Example I to Example III respectively satisfy the relationships shown in Table 7.

TABLE 8-continued

| | | | | | |
|---|---|---|---|---|---|
| 2-1 | 0.018 | 0.516 | 0.018 | 0.421 | 0.473 | 4.040 |
| 2-2 | 0.018 | 0.518 | 0.018 | 0.421 | 0.455 | 4.040 |
| 2-3 | 0.018 | 0.520 | 0.018 | 0.374 | 0.499 | 4.040 |
| 3-1 | 0.018 | 0.405 | 0.018 | 0.438 | 0.350 | 4.100 |
| 3-2 | 0.018 | 0.461 | 0.018 | 0.404 | 0.350 | 4.100 |
| 3-3 | 0.018 | 0.459 | 0.018 | 0.341 | 0.319 | 4.100 |

It should be noted that 1-1 in Table 7 and Table 8 indicates the first state of the optical lens assembly in Example I, 1-2 indicates the second state of the optical lens assembly in Example I, 1-3 indicates the third state of the optical lens assembly in Example I, 2-1 indicates the first state of the optical lens assembly in Example II, 2-2 indicates the second state of the optical lens assembly in Example II, 2-3 indicates the third state of the optical lens assembly in Example II, 3-1 indicates the first state of the optical lens assembly in Example III, 3-2 indicates the second state of the optical lens

TABLE 7

| | | example | | | | | | | | |
|---|---|---|---|---|---|---|---|---|---|---|
| conditional expression | | 1-1 | 1-2 | 1-3 | 2-1 | 2-2 | 2-3 | 3-1 | 3-2 | 3-3 |
| L/[f × tan(FOV/2)] | | 1.39 | 1.39 | 1.39 | 1.37 | 1.37 | 1.37 | 1.32 | 1.32 | 1.32 |
| f2/(CT2 + T23) + f2/(EP12 + CP2) | | −35.57 | −35.76 | −37.00 | −31.70 | −31.64 | −31.57 | −32.66 | −30.22 | −30.30 |
| fi/dis | i = 1 | 1.8 | 1.81 | 1.81 | 1.76 | 1.76 | 1.77 | 1.73 | 1.72 | 1.74 |
| | i = 3 | 3.44 | 3.47 | 3.38 | 9.98 | 9.89 | 9.98 | \ | \ | \ |
| | i = 4 | \ | \ | \ | 4.03 | 3.96 | 3.87 | 0.96 | 0.94 | 1.29 |
| Djs/R2j − 1 | j = 1 | 2.05 | 1.98 | 2.11 | 2.01 | 1.94 | 2.07 | 2 | 2.13 | 1.94 |
| | j = 4 | \ | \ | \ | \ | \ | \ | 0.37 | 0.37 | 0.35 |
| F1/(CP1 + EP12) − f2/(CP2 + EP12) | | 25.13 | 25.38 | 27.11 | 23.73 | 23.64 | 23.55 | 29.22 | 25.80 | 25.91 |
| \|f1/f3\| | | 0.48 | 0.48 | 0.48 | 0.16 | 0.16 | 0.16 | 0.18 | 0.18 | 0.18 |
| f1/f2 | | −0.40 | −0.40 | −0.40 | −0.38 | −0.38 | −0.38 | −0.40 | −0.40 | −0.40 |
| (R2n + R2n + 1)/dns | n = 1 | 6.17 | 6.18 | 6.19 | 5.43 | 5.45 | 5.48 | 5.51 | 5.47 | 5.54 |
| | n = 2 | 5.05 | 5 | 4.99 | 5.19 | 5.13 | 5.04 | 62.7 | 60.74 | 58.85 |
| | n = 3 | −6.6 | −6.65 | −6.49 | −5.56 | −5.51 | −5.56 | 8.31 | 8.04 | 8.31 |
| | n = 4 | −0.81 | −0.79 | −0.79 | −1.38 | −1.35 | −1.32 | −0.08 | −0.08 | −0.11 |
| R1/R9 | | 0.58 | 0.58 | 0.58 | 0.62 | 0.62 | 0.62 | 0.79 | 0.79 | 0.79 |
| R2/R10 | | 5.69 | 5.69 | 5.69 | 5.73 | 5.73 | 5.73 | 8.00 | 8.00 | 8.00 |
| R2/d1s + R9/d4s | | 4.51 | 4.50 | 4.50 | 4.18 | 4.18 | 4.18 | 4.10 | 4.06 | 4.30 |
| f23/EP23 + f45/EP34 | | 89.34 | 103.40 | 75.44 | −56.83 | −57.61 | −60.46 | 21.35 | 20.21 | 20.89 |
| \|f3/f4\| | | 0.00 | 0.00 | 0.00 | 1.65 | 1.65 | 1.65 | 5.38 | 5.38 | 5.38 |
| D2s/(CT2 + CT3) + D4s/(CT4 + CT5) | | 8.57 | 8.50 | 8.85 | 9.11 | 8.60 | 9.18 | 9.69 | 10.02 | 9.38 |
| (EPD + d1s)/(f − f1) | | 14.64 | 14.63 | 14.61 | 10.95 | 10.93 | 10.90 | 16.72 | 16.77 | 16.67 |

Table 8 shows some of the parameters of the optical lens assemblies in Example I to Example III.

assembly in Example III, and 3-3 indicates the third state of the optical lens assembly in Example III.

Table 9 shows the effective focal lengths of the first lens to the fifth lens of the optical lens assemblies in Example I to Example III.

TABLE 8

| | basic data | | | | | |
|---|---|---|---|---|---|---|
| example | d1s | D1s | d2s | d3s | d4s | D4s |
| 1-1 | 1.942 | 3.200 | 1.928 | 2.132 | 3.578 | 5.600 |
| 1-2 | 1.939 | 3.100 | 1.950 | 2.117 | 3.653 | 5.700 |
| 1-3 | 1.934 | 3.300 | 1.951 | 2.168 | 3.667 | 5.800 |
| 2-1 | 1.975 | 3.080 | 1.915 | 2.240 | 3.365 | 4.331 |
| 2-2 | 1.968 | 2.980 | 1.937 | 2.259 | 3.420 | 3.921 |
| 2-3 | 1.957 | 3.180 | 1.972 | 2.240 | 3.508 | 4.234 |
| 3-1 | 2.033 | 3.140 | 1.927 | 2.610 | 3.750 | 4.383 |
| 3-2 | 2.047 | 3.340 | 1.989 | 2.695 | 3.819 | 4.383 |
| 3-3 | 2.022 | 3.040 | 2.053 | 2.610 | 2.785 | 4.224 |

| | basic data | | | | | |
|---|---|---|---|---|---|---|
| example | CP1 | EP12 | CP2 | EP23 | EP34 | L |
| 1-1 | 0.018 | 0.473 | 0.018 | 0.405 | 0.930 | 4.000 |
| 1-2 | 0.018 | 0.468 | 0.018 | 0.354 | 1.000 | 4.000 |
| 1-3 | 0.018 | 0.437 | 0.018 | 0.473 | 0.888 | 4.000 |

TABLE 9

| | example | | |
|---|---|---|---|
| parameter | 1 | 2 | 3 |
| f1 (mm) | 3.50 | 3.47 | 3.53 |
| f2 (mm) | −8.83 | −9.20 | −8.83 |
| f3 (mm) | 7.34 | 22.35 | −19.36 |
| f4 (mm) | −2072.14 | 13.56 | 3.60 |
| f5 (mm) | −5.50 | −5.02 | −3.45 |
| f (mm) | 3.78 | 3.85 | 3.78 |
| f/EPD | 1.83 | 1.79 | 1.74 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical lens assembly described above.

Obviously, the embodiments described above are only a part of the embodiments of the present disclosure, and not all of the embodiments. Based on the embodiments in the present disclosure, all other embodiments obtained by those of ordinary skill in the art without making creative work shall fall within the scope of protection of the present disclosure.

It should be noted that the terms used herein are only intended to describe specific implementations, rather than limiting exemplary implementations according to the present disclosure. As used herein, unless otherwise expressly indicated in the context, the singular form is also intended to include the plural form, furthermore, it should be understood that when the terms "including" and/or "comprising" are used in this specification, it indicates the presence of features, steps, work, devices, assemblies and/or combinations thereof.

It should be noted that the terms "first", "second", etc. in the specification and claims of the present disclosure and the above accompanying drawings are used to distinguish similar objects, and do not have to be used to describe a specific order or sequence. It should be understood that the data so used may be interchangeable where appropriate, so that the implementations of the present disclosure described herein can be implemented in an order other than those illustrated or described herein.

The foregoing is only a description for the preferred embodiments of the present disclosure and is not intended to limit the present disclosure, for those skilled in the art, the present disclosure may have various changes and variations. Any modification, equivalent substitution, improvement, etc. made within the spirit and principles of the present disclosure shall be included in the scope of protection of the present disclosure.

What is claimed is:

1. An optical lens assembly, comprising:

a lens barrel;

five lenses, the five lenses comprising a first lens, a second lens, a third lens, a fourth lens, and a fifth lens sequentially from an object side to an image side;

a first spacer, in contact with at least part of an image-side surface of the first lens;

a second spacer, in contact with at least part of an image-side surface of the second lens;

wherein a focal length $f2$ of the second lens, a center thickness $CT2$ of the second lens on the optical axis, an air spacing $T23$ on the optical axis between the second lens and the third lens, a maximum thickness $CP2$ of the second spacer, and a distance $EP12$ between an image-side surface of the first spacer and an object-side surface of the second spacer along the optical axis, satisfy:

$$-50.0 < f2/(CT2+T23)+f2/(EP12+CP2) < 0.$$

2. The optical lens assembly according to claim 1, wherein a center thickness of the second lens on an optical axis of the optical lens assembly is less than center thicknesses of other four lenses on the optical axis, and the center thickness $CT2$ of the second lens on the optical axis is less than 0.4 mm.

3. The optical lens assembly according to claim 2, wherein a height $L$ of the lens barrel, a focal length $f$ of the optical lens assembly, and a maximal field-of-view FOV of the optical lens assembly satisfy: $1.2 < L/[f \times \tan(FOV/2)] < 1.6$.

4. The optical lens assembly according to claim 1, wherein at least one lens in the first to the fourth lenses has a positive refractive power, and a lens having a positive refractive power in the first to the fourth lenes satisfies: $0.1 < fi/dis < 10.0$; wherein fi is an effective focal length of an ith lens, dis is an inner diameter of an object-side surface of an ith spacer in contact with an image-side surface of the ith lens, and i takes a value from 1, 2, 3, or 4.

5. The optical lens assembly according to claim 1, wherein an absolute value of a focal length of at least one lens in the first to the fourth lenses is less than 5, a lens having the absolute value of the focal length less than 5 and with an image-side surface in contact with a spacer satisfies: $0 < Djs/R2j-1 < 5.0$, wherein R2j−1 is a radius of curvature of an object-side surface of a jth lens, Djs is an outer diameter of an object-side surface of a jth spacer in contact with an image-side surface of the jth lens, and j takes a value from 1, 2, 3, or 4.

6. The optical lens assembly according to claim 1, wherein the optical lens assembly satisfies: $10.0 < f1/(CP1+EP12)-f2/(CP2+EP12) < 50.0$, wherein f1 is an effective focal length of the first lens, f2 is the effective focal length of the second lens, CP1 is a thickness of the first spacer, CP2 is a thickness of the second spacer, EP12 is the distance between the image-side surface of the first spacer and the object-side surface of the second spacer on the optical axis.

7. The optical lens assembly according to claim 1, wherein the first to the fourth lenses satisfy: $-10.0 < (R2n+R2n+1)/dns < 70.0$, R2n is a radius of curvature of an image-side surface of a nth lens, R2n+1 is a radius of curvature of an object-side surface of a (n+1)th lens, dns is an inner diameter of an object-side surface of an nth spacer in contact with the image-side surface of the nth lens, and n takes a value from 1, 2, 3, or 4.

8. The optical lens assembly according to claim 1, wherein the optical lens assembly further comprises a fourth spacer in contact with an image-side surface of the fourth lens, a radius of curvature R2 of an image-side surface of the first lens, a radius of curvature R9 of an object-side surface of the fifth lens, an inner diameter d1s of an object-side surface of the first spacer, and an inner diameter d4s of an object-side surface of the fourth spacer, satisfy: $1.0 < R2/d1s+R9/d4s < 10.0$.

9. The optical lens assembly according to claim 1, wherein the optical lens assembly further comprises a fourth spacer in contact with an image-side surface of the fourth lens, and a third spacer in contact with an image-side surface of the third lens, wherein a combined focal length f23 of the first lens and the second lens, a combined focal length f45 of the fourth lens and the fifth lens, a distance EP23 between an image-side surface of the second spacer and an object-side surface of the third spacer along the optical axis, and a distance EP34 between an image-side surface of the third spacer and an object-side surface of the fourth spacer along the optical axis, satisfy:

$$-100.0 < f23/EP23+f45/EP34 < 110.0.$$

10. The optical lens assembly according to claim 1, wherein the optical lens assembly further comprises a fourth spacer in contact with an image-side surface of the fourth lens, a center thickness CT2 of the second lens on the optical axis, a center thickness CT3 of the third lens on the optical axis, a center thickness CT5 of the fifth lens on the optical axis, an outer diameter D2s of the object-side surface of the second spacer, and an outer diameter D4s of an object-side surface of the fourth spacer, satisfy: $5.0 < D2s/(CT2+CT3)+D4s/(CT4+CT5) < 15.0$.

11. The optical lens assembly according to claim 1, wherein an entrance pupil diameter EPD of the optical lens assembly, an inner diameter d1s of an object-side surface of the first spacer, an effective focal length f of the optical lens assembly, and an effective focal length f1 of the first lens, satisfy: $5.0 < (EPD+d1s)/(f-f1) < 20.0$.

12. The optical lens assembly according to claim 1, wherein a refractive power of the first lens and a refractive power of the second lens are positive-negative opposite.

13. The optical lens assembly according to claim 1, wherein an effective focal length f1 of the first lens, the effective focal length f2 of the second lens, and an effective focal length f3 of the third lens, satisfy: $|f1/f3| < 1.0$, and $f1/f2 < -0.01$.

14. The optical lens assembly according to claim 1, wherein a radius of curvature R3 of an object-side surface of the second lens, a radius of curvature R4 of the image-side surface of the second lens, and a radius of curvature R6 of an image-side surface of the third lens, satisfy: $R3 > R4$, and $|R4| < |R6|$.

15. The optical lens assembly according to claim 1, wherein an absolute value of a radius of curvature of each of the first to fourth lenses is greater than an absolute value of a radius of curvature of an image-side surface of the fifth lens.

16. The optical lens assembly according to claim 1, wherein a radius of curvature R1 of an object-side surface of the first lens, a radius of curvature R2 of the image-side surface of the first lens, a radius of curvature R9 of an object-side surface of the fifth lens, and a radius of curvature R10 of an image-side surface of the fifth lens, satisfy: $R1/R9 > 0.1$, and $R2/R10 > 1.0$.

17. An optical lens assembly, comprising:

a lens barrel;

five lenses, the five lenses comprising a first lens, a second lens, a third lens, a fourth lens, and a fifth lens sequentially from an object side to an image side;

a first spacer, in contact with at least part of an image-side surface of the first lens;

a second spacer, in contact with at least part of an image-side surface of the second lens;

wherein an effective focal length f1 of the first lens, an effective focal length f2 of the second lens, a thickness CP1 of the first spacer, a thickness CP2 of the second spacer, and a distance EP12 between an image-side surface of the first spacer and an object-side surface of the second spacer on the optical axis satisfy: $10.0 < f1/(CP1+EP12)-f2/(CP2+EP12) < 50.0$.

18. The optical lens assembly according to claim 17, wherein a height L of the lens barrel, a focal length f of the optical lens assembly, and a maximal field-of-view FOV of the optical lens assembly satisfy: $1.2 < L/[f \times \tan(FOV/2)] < 1.6$.

19. The optical lens assembly according to claim 18, wherein a center thickness of the second lens on an optical axis of the optical lens assembly is less than center thicknesses of other four lenses on the optical axis, and the center thickness CT2 of the second lens on the optical axis is less than 0.4 mm.

20. The optical lens assembly according to claim 17, wherein at least one lens in the first to the fourth lenses has a positive refractive power, and a lens having a positive refractive power in the first to the fourth lenes satisfies: $0.1 < fi/dis < 10.0$; wherein fi is an effective focal length of an ith lens, dis is an inner diameter of an object-side surface of an ith spacer in contact with an image-side surface of the ith lens, and i takes a value from 1, 2, 3, or 4.

\*   \*   \*   \*   \*